United States Patent
Seo et al.

(10) Patent No.: US 11,357,046 B2
(45) Date of Patent: Jun. 7, 2022

(54) METHOD AND APPARATUS FOR CONTROLLING SIGNAL TRANSMISSION OF TERMINAL SUPPORTING PLURALITY OF CARRIERS

(71) Applicant: LG ELECTRONICS INC., Seoul (KR)

(72) Inventors: Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 166 days.

(21) Appl. No.: 16/958,666

(22) PCT Filed: Dec. 28, 2018

(86) PCT No.: PCT/KR2018/016896
§ 371 (c)(1),
(2) Date: Jun. 26, 2020

(87) PCT Pub. No.: WO2019/132607
PCT Pub. Date: Jul. 4, 2019

(65) Prior Publication Data
US 2021/0068153 A1    Mar. 4, 2021

Related U.S. Application Data

(60) Provisional application No. 62/611,552, filed on Dec. 29, 2017.

(51) Int. Cl.
*H04W 74/08* (2009.01)
*H04W 4/40* (2018.01)
(Continued)

(52) U.S. Cl.
CPC ......... *H04W 74/0808* (2013.01); *H04W 4/40* (2018.02); *H04W 72/02* (2013.01); *H04W 72/0453* (2013.01); *H04W 92/18* (2013.01)

(58) Field of Classification Search
CPC ............ H04W 4/40–48; H04W 72/02; H04W 72/0453; H04W 74/0808–0825; H04W 84/04–08; H04W 92/18
See application file for complete search history.

(56) References Cited

U.S. PATENT DOCUMENTS 11,019,663 B2 *   5/2021   Noh .................... H04L 27/26
11,064,364 B2 *   7/2021   Noh ..................... H04L 5/0053
(Continued)

FOREIGN PATENT DOCUMENTS

KR    20170015251    2/2017
KR    20170037496    4/2017
(Continued)

OTHER PUBLICATIONS

PCT International Application No. PCT/KR2018/016896, International Search Report dated Mar. 26, 2019, 4 pages.
(Continued)

*Primary Examiner* — Thomas R Cairns
(74) *Attorney, Agent, or Firm* — Lee, Hong, Degerman, Kang & Waimey PC

(57) ABSTRACT

One embodiment of the present specification suggests a method and an apparatus for supporting a plurality of carriers in a single UE. Each carrier can support V2X communication of various standards. The UE can perform an improved backoff operation for at least one carrier. The backoff operation applied to any one of the carriers can be performed on the basis of the operation of another carrier. For example, the backoff operation can be performed on the basis of whether or not a signal is received by the other carrier. The backoff operation based on the present specification can solve a technical problem which arises when different operations are performed in the plurality of carriers.

16 Claims, 22 Drawing Sheets

(51) Int. Cl.
*H04W 72/02* (2009.01)
*H04W 72/04* (2009.01)
*H04W 92/18* (2009.01)

(56) References Cited

U.S. PATENT DOCUMENTS

2007/0060158 A1   3/2007   Medepalli et al.
2015/0257160 A1   9/2015   Ishida et al.

FOREIGN PATENT DOCUMENTS

| WO | WO-2016068563 A1 * | 5/2016 | ............ H04W 72/12 |
|----|---|---|---|
| WO | 2017074070 | 5/2017 | |
| WO | 2017142452 | 8/2017 | |
| WO | 2017150956 | 9/2017 | |

OTHER PUBLICATIONS

European Patent Office Application Serial No. 18894728.7, Search Report dated Sep. 3, 2021, 6 pages.

\* cited by examiner partial coverage out-of-coverage in coverage

METHOD AND APPARATUS FOR CONTROLLING SIGNAL TRANSMISSION OF TERMINAL SUPPORTING PLURALITY OF CARRIERS

CROSS-REFERENCE TO RELATED APPLICATIONS

This application is the National Stage filing under 35 U.S.C. 371 of International Application No. PCT/KR2018/016896, filed on Dec. 28, 2018, which claims the benefit of U.S. Provisional Application No. 62/611,552, filed on Dec. 29, 2017, the contents of which are all hereby incorporated by reference herein in their entirety.

BACKGROUND

Technical Field

The disclosure relates to a terminal supporting a plurality of carriers and, more particularly, to a method and apparatus for controlling signal transmission through a back-off operation on a plurality of carriers.

Related Art

Recently, there is a growing interest in a sidelink or device-to-device (D2D) technique for performing direct communication between devices. In particular, the sidelink or D2D is drawing attention as a communication technique for a public safety network.

The public safety network has a higher service requirement (reliability and safety) in comparison with the commercial communication network, and in particular, although cellular communication is performed in an out-of-coverage state or is not available, also demands direct signal transmission/reception between devices, i.e., a sidelink (or D2D) operation.

The sidelink (or D2D) operation may have various advantages in a sense that it is signal transmission/reception between proximate devices. For example, a D2D user equipment (UE) may perform data communication with a high transfer rate and a low delay. Further, the D2D operation may distribute traffic concentrated on a base station, and may have a role of extending coverage of the base station if the D2D UE plays a role of a relay.

The aforementioned sidelink (or D2D) communication may be extended to apply to signal transmission/reception between vehicles, and communication related to the vehicle is particularly called vehicle-to-everything (V2X) communication.

In the V2X, the term 'X' may be a pedestrian, a vehicle, or an infrastructure/network, which may be indicated respectively by V2P, V2V, or V2I/N.

V2X communication may be implemented based on a sidelink defined based on Release 14 and/or Release 15 of the 3GPP standard, for example. Since the 3GPP standard is based on cellular communication, V2X communication implemented based on the 3GPP standard is called cellular V2X (C-V2X). Meanwhile, C-V2X may be implemented based on a 3GPP new radio (NR) standard (e.g., 3GPP Release 16 or an evolution thereof) to be described later.

Additionally, V2X communication may also be implemented based on the IEEE 802.11p standard. V2X based on the IEEE 802.11p standard is called dedicated short-range communications (DSRC) V2X or DSRC-based V2X.

SUMMARY

In order to increase the communication capacity, a scheme supporting a plurality of carriers based on various frequency bands is necessary. However, if one UE supports a plurality of carriers, various problems may occur. For example, if a signal is received through any one carrier and simultaneously a signal is transmitted through another carrier, a problem, such as self-interference, may occur. The disclosure proposes an example for improving a problem occurring when a UE supporting a sidelink supports a plurality of carriers.

An example of the disclosure may be used for a terminal supporting a plurality of carriers. In a method based on an example of the disclosure, a first carrier and a second carrier may be configured in a terminal. Each of the carriers may support various communication standards. For example, the first carrier and/or the second carrier may be used for a sidelink or a DSRC standard.

Based on an example of the disclosure, a back-off operation may be performed on the first carrier and/or the second carrier. The back-off operation may include modified technical characteristics of a conventional carrier sense multiple access/collision avoidance (CSMA/CA) scheme. The back-off operation is performed based on a back-off counter. If the back-off operation is applied to the second carrier, the back-off operation for the second carrier may be performed based on whether the terminal receives reception data through the first carrier. Furthermore, whether to transmit transmission data through the second carrier may be determined based on the back-off operation for the second carrier.

An example of the disclosure can improve performance of the same terminal supporting a plurality of carriers. For example, an example of the disclosure can newly propose a back-off operation applied to at least one carrier. Such a back-off operation can solve various problems occurring when different communication operations are performed in different carriers. For example, an example of the disclosure enables efficient communication by properly controlling an operation in a corresponding carrier if reception is performed in any one carrier and transmission is performed in another carrier.

DESCRIPTION OF EXEMPLARY EMBODIMENTS

Hereinafter, an example for supporting claimed feature is described. The following example should be construed in such a way as to not limit the claimed feature.

Meanwhile, "/" or a comma used in this document may mean and/or. For example, "A/B" means "A and/or B", and may mean any one of "A only" or "B only" or "A and B." Furthermore, technical characteristics individually described within one drawing may be individually implemented or may be implemented at the same time.

Technical features described below may be used in a communication standard by the 3$^{rd}$ generation partnership project (3GPP) standardization organization or a communication standard by the institute of electrical and electronics engineers (IEEE) standardization organization. For example, the communication standard by the 3GPP standard organization includes long term evolution (LTE) and/or an evolution of an LTE system. The evolution of the LTE system include LTE-advanced (LTE-A), LTE-A Pro, and/or a5G new radio (NR). The communication standard by the IEEE standard organization includes a wireless local area network (LAN) system such as IEEE 802.11a/b/g/b/ac/ax or the like. The aforementioned system uses various multiple access techniques such as orthogonal frequency division multiple access (OFDMA) and/or single carrier-frequency division multiple access (SC-FDMA) or the like in uplink and/or downlink. For example, only the OFDMA may be used in downlink and only the SC-FDMA may be used in uplink, or the OFDMA and the SC-FDMA may be used together in downlink and/or uplink.

Figure 1:
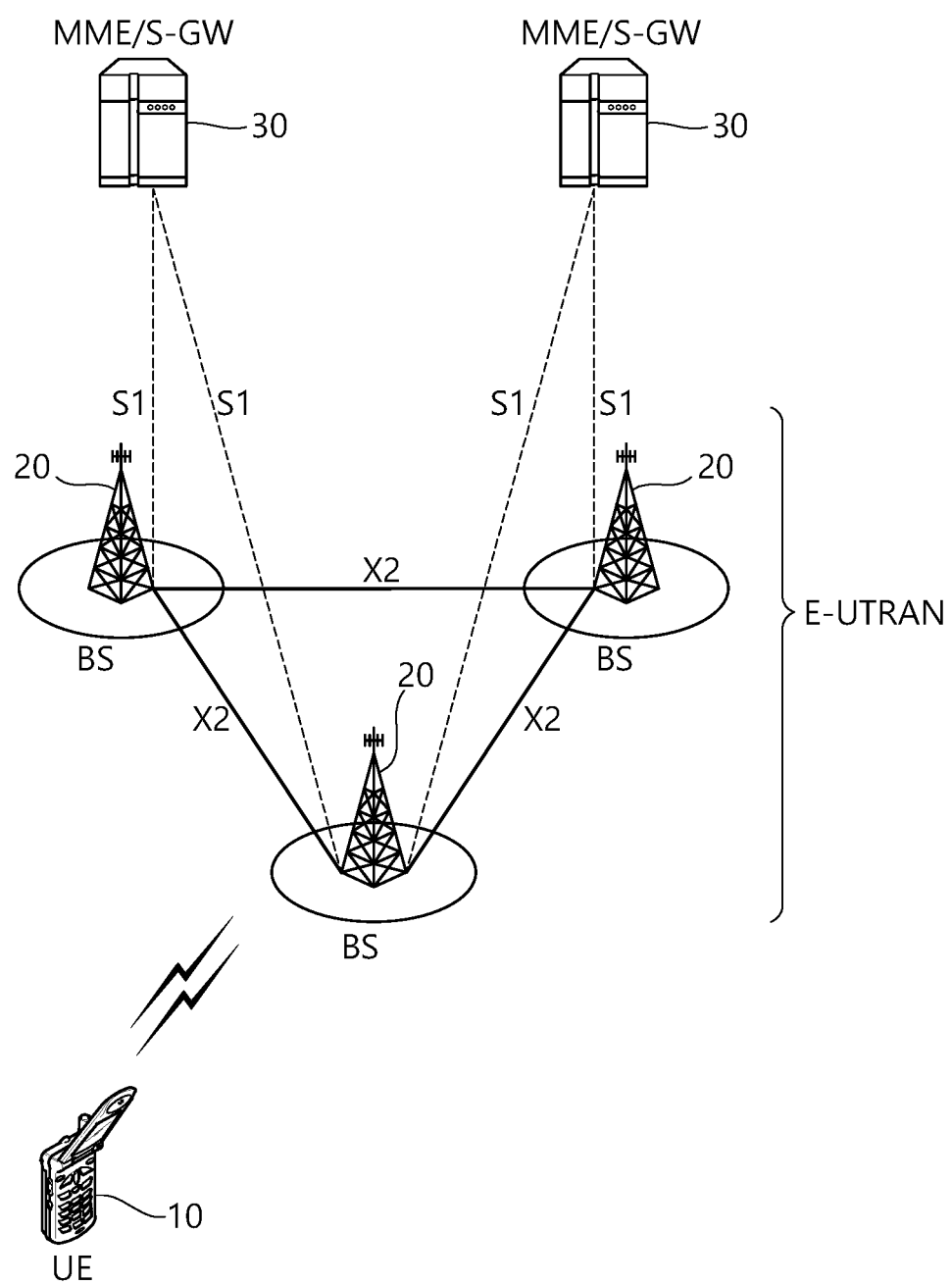
FIG. 1 illustrates an example of a radio communication system to which technical characteristics of the disclosure may be applied.

FIG. 1 shows an example of a wireless communication system to which a technical feature of the present specification is applicable. Specifically, FIG. 1 is an example based on an evolved-universal terrestrial radio access network (E-UTRAN). The aforementioned LTE is part of evolved-UMTS (E-UMTS) using the E-UTRAN.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S 1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Figure 2:
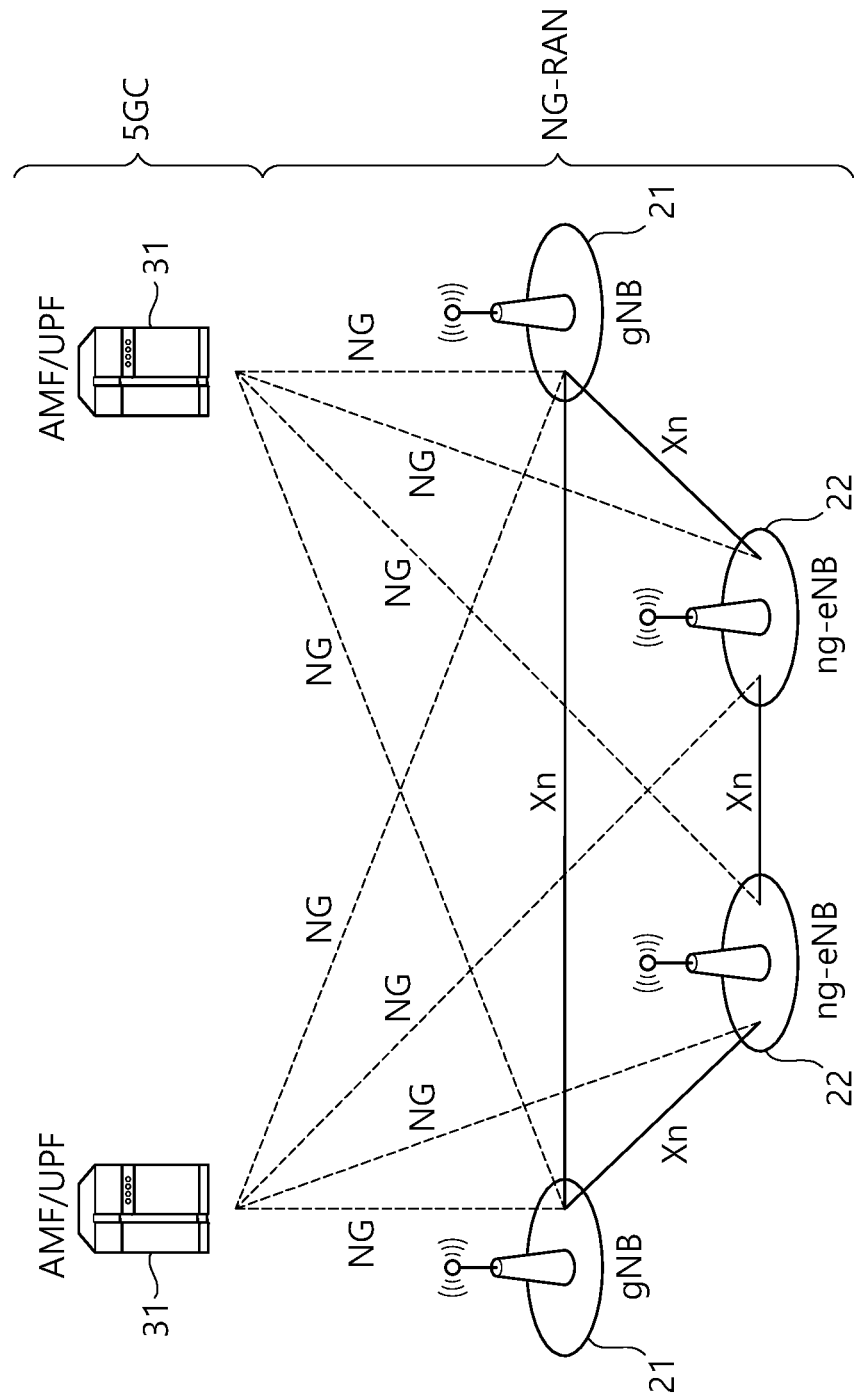
FIG. 2 illustrates another example of a radio communication system to which technical characteristics of the disclosure may be applied.

FIG. 2 shows another example of a wireless communication system to which a technical feature of the present specification is applicable. Specifically, FIG. 2 is an example in which a 5G new radio (NR) standard is utilized. A communication entity used in the 5G NR standard (hereinafter, "NR" standard) incorporates all or some functions of the entity (eNB, MME, S-GW) introduced in FIG. 1, and may be identified as a name "NG" or "ng" so as to be distinguished from the conventional standard.

The system of FIG. 2 includes a next generation-radio access network (NG-RAN) communicating with a user equipment (UE). NG-RANs 21 and 22 are entities corresponding to a BS, and include a gNB 21 or an ng-eNB 22. A network interface called an Xn interface is defined between the NG-RANs 21 and 22. The gNB 21 provides an NR user plane and control plane for the UE, and is connected to a 5G core network (5GC) via the NG interface of FIG. 2. The Ng-eNB 22 is an entity for providing a user plane and control plane based on evolved-universal terrestrial radio access (UTRA), and is connected to the 5GC via the NG interface.

An access and mobility management function (AMF) is an entity including a function of the conventional MME, and communicates with the NG-RANs 21 and 22 via an NG-C interface. The NG-C interface is a control plane interface between the NG-RAN and the AMF.

A user plane function (UPF) is an entity including a function of the conventional S-GW, and communicates with the NG-RANs 21 and 22 via an NG-U interface. The NG-U interface is a user plane interface between the NG-RAN and the AMF.

On the system of FIG. 1 and/or FIG. 2, layers of a radio interface protocol between the network (NG-RAN and/or E-UTRAN) and the UE can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and a BS.

Hereinafter, a structure of a radio frame transmitted/received through a physical channel will be described.

In the LTE standard (and the evolution of the LTE standard), one radio frame consists of 10 subframes in a time domain, and one subframe consists of 2 slots in the time domain. One subframe may have a length of 1 millisecond (ms), and one slot may have a length of 0.5 ms. A time for transmitting one subframe is defined as a transmission time interval (TTI). The TTI may be a minimum unit of scheduling.

Unlike the LTE standard, the NR standard supports various numerologies, and thus a radio frame is configured in various structures. In the NR standard, a plurality of subcarrier spacings are supported on a frequency domain. A numerology of the NR is determined by a numerology in use. The plurality of numerologies supported in the NR are shown in Table 1 below. Each numerology is identified by an index "$\mu$".

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As shown in Table 1, a subcarrier spacing may be determined as one of 15, 30, 60, 120, and 240 kHz. However, since a specific numeral value is changeable, each spacing (e.g., $\mu$=0, 1 ... 4) may be indicated by $1^{st}$ and $2^{nd}$ to $5^{th}$ subcarrier spacings (i.e., N subcarrier spacings). As shown in Table 1, it may not be used to transmit user data (e.g., physical uplink shared channel (PUSCH), physical downlink shared channel (PDSCH), etc.) based on a subcarrier spacing. That is, user data transmission may not be supported only in predetermined at least one subcarrier spacing (e.g., 240 kHz).

In addition, as shown in Table 1, a synchronization channel (e.g., primary synchronization signal (PSS), secondary synchronization signal (SSS), physical broadcast channel (PBCH), etc.) may not be supported based on the subcarrier spacing. That is, the synchronization channel may not be supported only in specific at least one subcarrier spacing (e.g., 60kHz).

In the NR standard, the number of slots and the number of symbols to be included may be set differently based on various numerologies, i.e., various subcarrier spacings. A specific example thereof may be as shown in Table 2 below.

TABLE 2

| $\mu$ | Number of symbols in slot | Number of slots in radio frame | Number of slots in subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Based on Table 2, when a first numerology with "$\mu$=0" is applied, one radio frame includes 10 subframes, one subframe corresponds to 1 slot, and 1 slot includes 14 symbols. In the present specification, a 'symbol' means a signal transferred for a specific time duration, and for example, may mean a signal generated by orthogonal frequency division multiplexing (OFDM) processing. That is, a symbol of the present specification may mean an OFDM/OFDMA symbol or an SC-FDMA symbol or the like. A cyclic prefix (CP) may be located between the symbols. An example of Table 2 may be an example to be applied to a normal CP.

Figure 3:
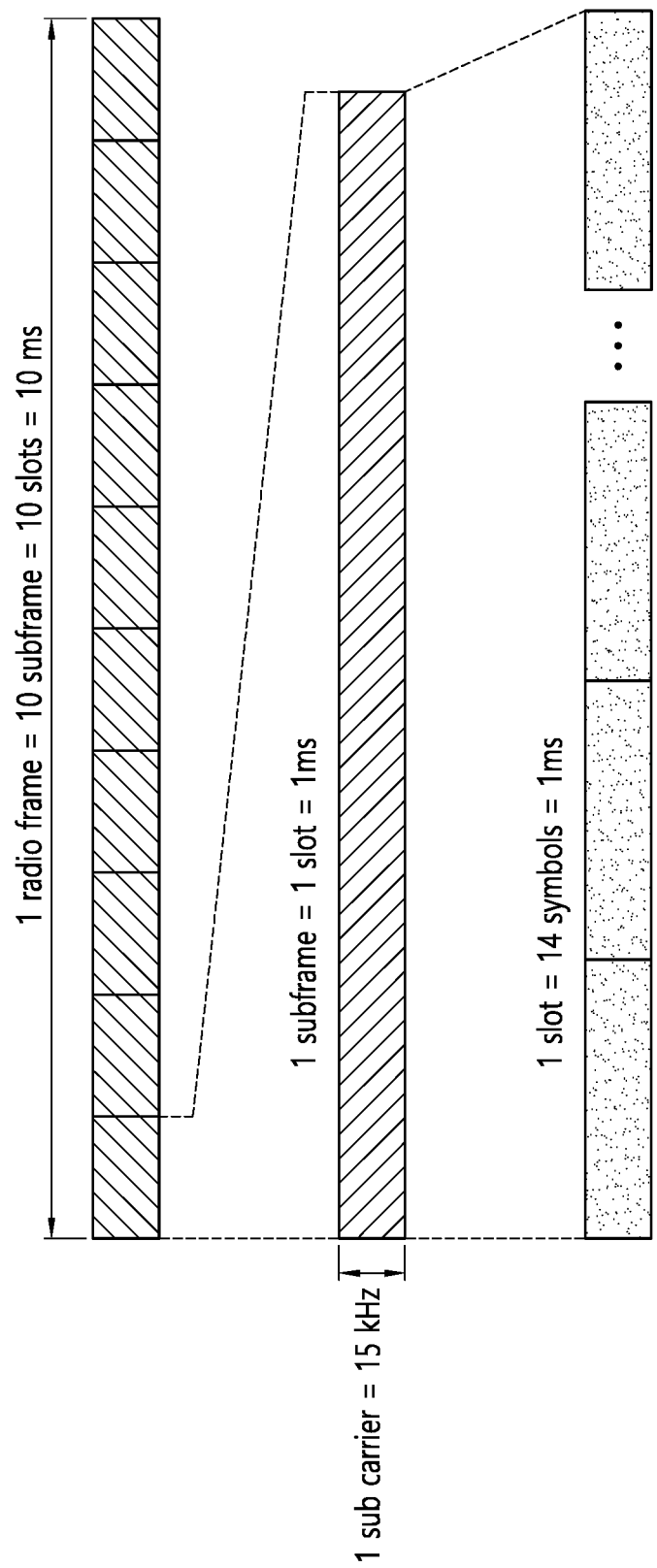
FIG. 3 illustrates an example to which a specific numerology is applied.

FIG. 3 shows an example to which a specific numerology is applied. That is, FIG. 3 shows a case of $\mu$=0.

Figure 4:
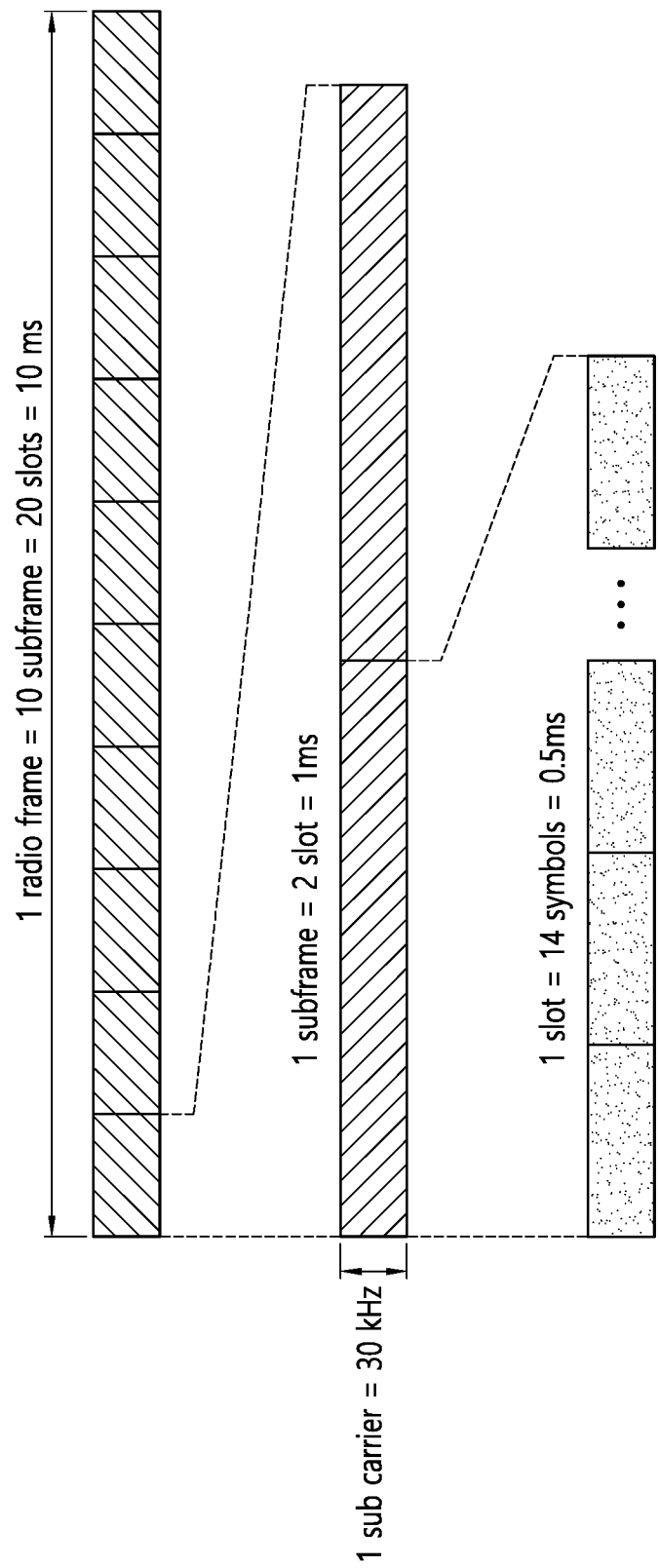
FIG. 4 illustrates an example to which another numerology is applied.

FIG. 4 shows an example to which another numerology is applied. That is, FIG. 4 shows a case of $\mu$=1.

Meanwhile, frequency division duplex (FDD) and/or time division duplex (TDD) may be applied in a wireless system to which an example of the present specification is applied. When TDD is applied, uplink and downlink subframes are allocated on a subframe basis in an LTE system.

In case of an NR standard/system, each symbol may be divided into downlink (indicated by D), flexible (indicated by X) and uplink (indicated by U). The content of the following table may be applied commonly to a specific cell, or may be applied commonly to adjacent cells, or may be applied individually or differently for each UE.

TABLE 3

| For- | Symbol number in a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |

For convenience of explanation, Table 3 shows only part of a format (e.g., TDD format) defined in the actual NR standard. A specific allocation scheme may be changed or added. A UE may have a slot format (i.e., TDD format) configured through a higher layer signal, may have a slot format configured through downlink control information (DCI) transmitted through a physical downlink control channel (PDCCH), or may have a slot format configured through a combination of a higher layer signal (RRC signal) and DCI.

Figure 5:
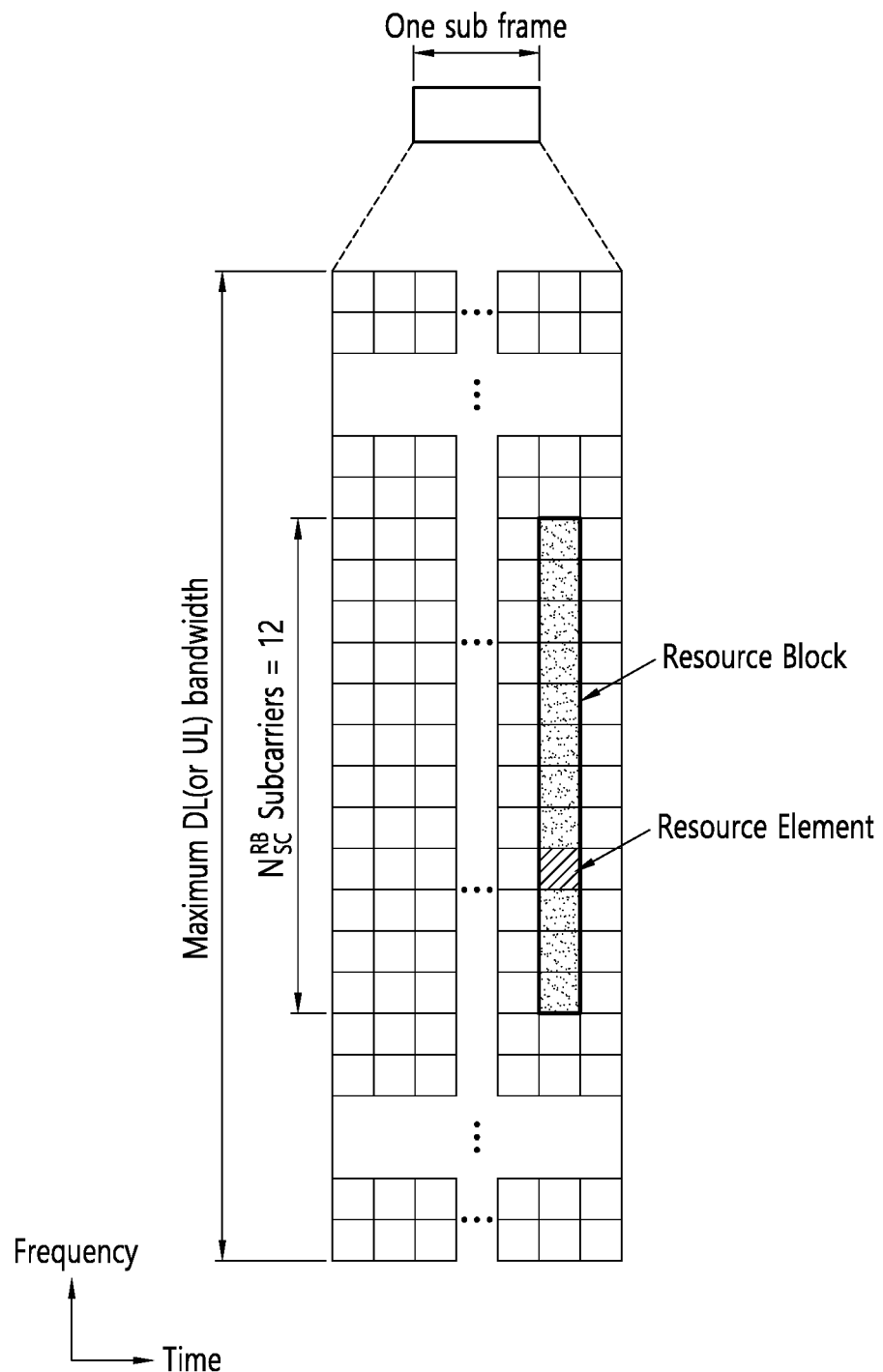
FIG. 5 is a diagram illustrating an example of a resource grid.

FIG. 5 is a drawing showing an example of a resource grid. The example of FIG. 5 is a time-frequency resource grid used in the NR standard. The example of FIG. 5 may be applied to uplink and/or downlink. As illustrated, a plurality of slots are included on a time axis in one subframe. Specifically, when expressed based on a value "$\mu$", "$14 \times 2^{\mu}$" symbols may be expressed in a resource grid. In addition, as illustrated, one resource block (RB) may occupy 12 contiguous subcarriers. One RB may be called a physical RB (PRB), and 12 resource elements (REs) may be included in each PRB. The number of RBs that can be allocated may be determined based on a minimum value and a maximum value. In addition, the number of RBs that can be allocated may be individually set based on a numerology "$\mu$", and may be set as the same value or different values for uplink and downlink.

Hereinafter, a cell search scheme performed in the NR standard will be described. A UE may obtain a time and/or frequency synchronization with a cell, and may perform cell discovery to obtain a cell identifier (ID). A synchronization channel such as a primary synchronization signal (PSS), a secondary synchronization signal (SSS), a physical broadcast channel (PBCH), or the like may be used for the cell discovery.

Figure 6:
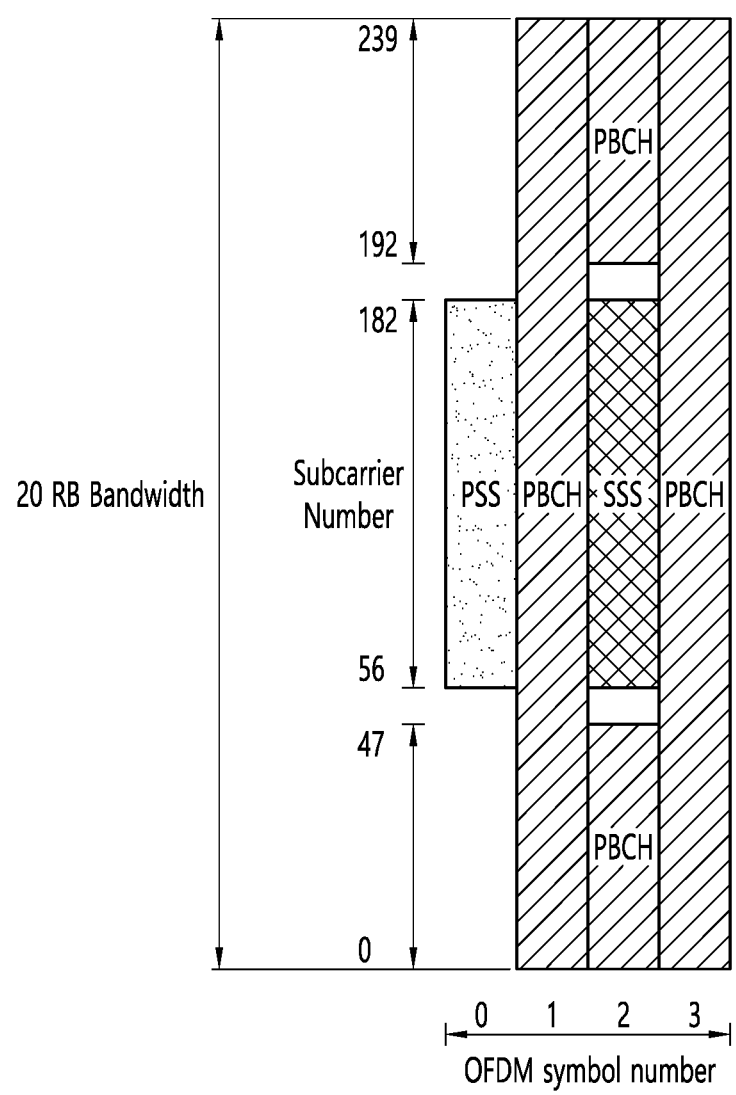
FIG. 6 illustrates an example of a sync channel applied to an example of the disclosure.

FIG. 6 shows an example of a synchronization channel applied to an embodiment of the present specification. As illustrated, a PSS and an SSS may include one symbol and 127 subcarriers, and a PBCH may be transmitted through 3 symbols and may include 240 subcarriers.

The PSS is used to obtain synchronization signal/PBCH block (SSB) symbol timing, and indicates three hypotheses for identifying a cell ID. The SSS is used to identify the cell ID, and indicates 336 hypotheses. As a result, 1008 physical cell IDs may be configured through the PSS and the SSS.

The SSB block may be transmitted repeatedly based on a predetermined pattern within a 5 ms window. For example, when L SSB blocks are transmitted, all of SSB #1 to SSB #L include the same information, but may be transmitted through beams of different directions. That is, a quasi co-location (QCL) may not be applied for the SSB blocks within the 5 m window. A beam used to receive the SSB block may be used in a subsequent operation (e.g., a random access operation or the like) between a UE and a network. The SSB block may be repeated with a specific period. A repetition period may be determined individually based on a numerology.

As illustrated, the PBCH has a bandwidth of 20 RBs in $2^{nd}/4^{th}$ symbols, and has a bandwidth of 8 RBs in a $3^{rd}$ symbol. A DM-RS for decoding the PBCH is included in the PBCH. A frequency domain is determined in the DMRS based on a cell ID value. Unlike in the LTE standard, since a cell-specific RS (CRS) is not defined in NR, a specific DM-RS is defined for demodulation of the PBCH. A PBCH-DMRS may include information indicating an SSB index.

The PBCH performs various functions, and may perform a function of representatively broadcasting a master information block (MIB). By reference, system information (SI) is divided into minimum SI (MSI) and other SI (OSI). The minimum SI may be divided again into MIB and system information type1 (SIB1), and the remaining minimum SI except for the MIB may be called remaining minimum SI (RMSI).

The MIB includes information required to decode the SIB1. For example, the MIB includes the SIB1 (a message 2/4 used in the random access procedure, a subcarrier spacing applied to other system information (SI)), a frequency offset between the SSB and an RB transmitted later, a bandwidth of PDCCH/SIB, and information for decoding the PDCCH (e.g., information on search-space/CORESET/DM-RS or the like described below). The MIB may be transmitted periodically, and the same information may be transmitted repeatedly for a time duration of 80 ms. The SIB1 is transmitted repeatedly through the PDSCH, and includes control information for initial access of the UE and information for decoding a different SIB.

Hereinafter, a sidelink or D2D operation to which an example of the present specification is applied will be described.

Figure 7:
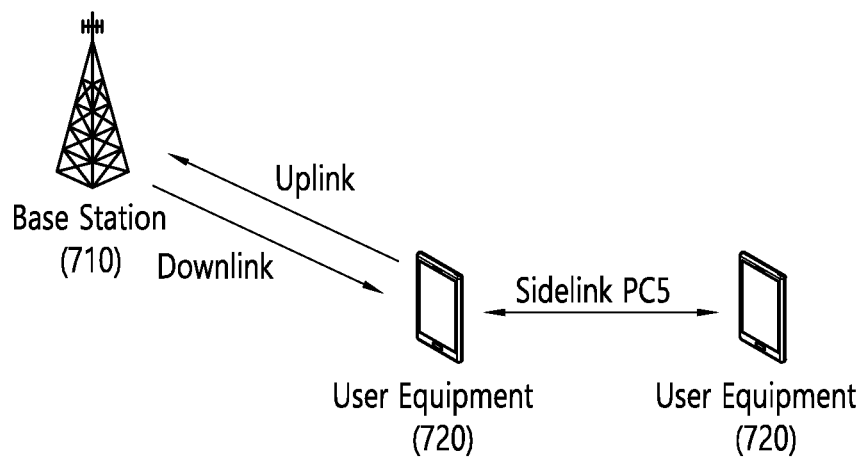
FIG. 7 is a diagram related to the structure of a sidelink to which an example of the disclosure is applied.

FIG. 7 is a drawing for a structure of sidelink to which an example of the present specification is applied. As illustrated, uplink (UL) and downlink (DL) may be defined between a BS 710 and a UE 720. In addition, sidelink (SL) is defined between the UEs 720. The SL corresponds to a PC5 interface defined on the 3GPP standard. For example, a resource allocated to the SL may be selected from UL resources. Specifically, a subframe (or a time resource such as a slot or the like) on a UL frequency through FDD or a subframe (or a time resource such as a slot or the like) allocated on UL through TDD may be allocated.

The term "ProSe communication" may be used in the same concept as the SL. In general, the ProSe means an end-to-end application. The SL may mean a channel structure. Specifically, a structure for a physical/transport/logical channel or the like used for an air-interface to realize the ProSe application is described in general in the concept as the SL.

Figure 8:
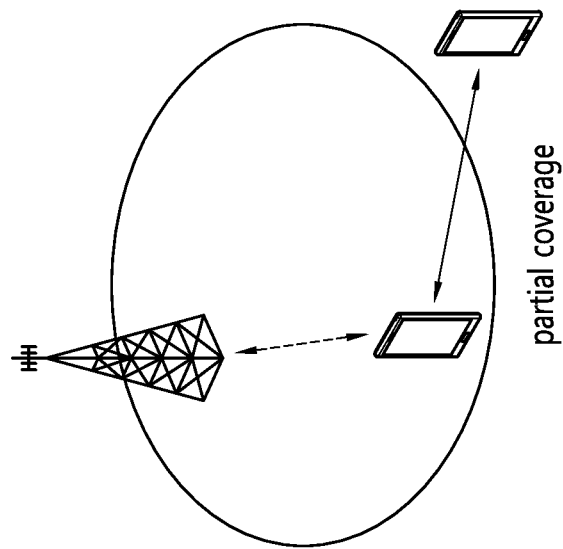
FIG. 8 is a diagram illustrating an example of a scenario to which a sidelink is applied.
Figure 8:
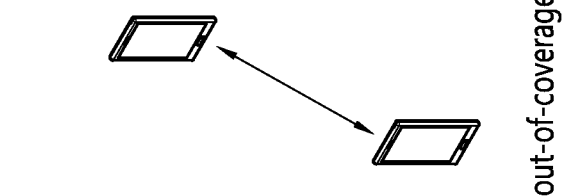
Figure 8:
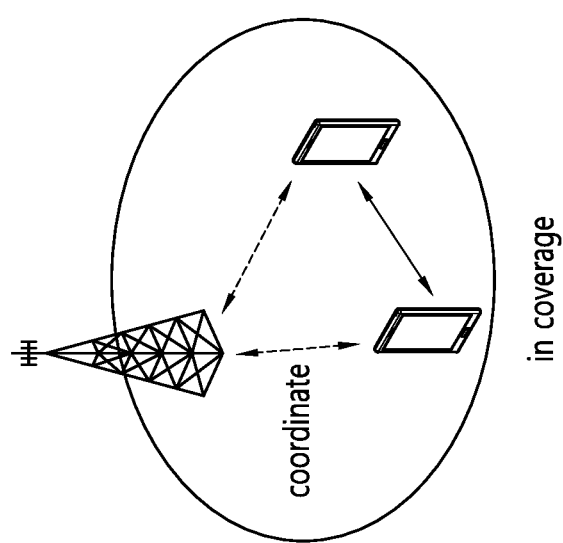

FIG. 8 is a drawing showing an example of a scenario to which sidelink is applied. As illustrated, sidelink (SL) or Prose communication may be divided into three scenarios. First, in an in-coverage scenario, a network (e.g., BS) may allocate a specific resource for sidelink (or ProSe) to a transmitting UE, or may allocate a resource pool (RP) that can be used by the transmitting UE. Second, an out-of-coverage scenario is a case where a network-based control is impossible. The transmitting UE may perform SL communication through a predetermined resource (e.g., a resource predetermined through USIM or UICC card or the like). Even in case of an out-of-coverage scenario, it may be an in-coverage situation for normal cellular traffic, and there may be no coverage only for ProSe communication. Finally, in a partial coverage scenario, an in-coverage UE and an out-of-coverage UE co-exist. Specifically, the out-of-coverage UE may use a predetermined resource, and the in-coverage UE may perform communication through a resource controlled by the network.

Figure 9:
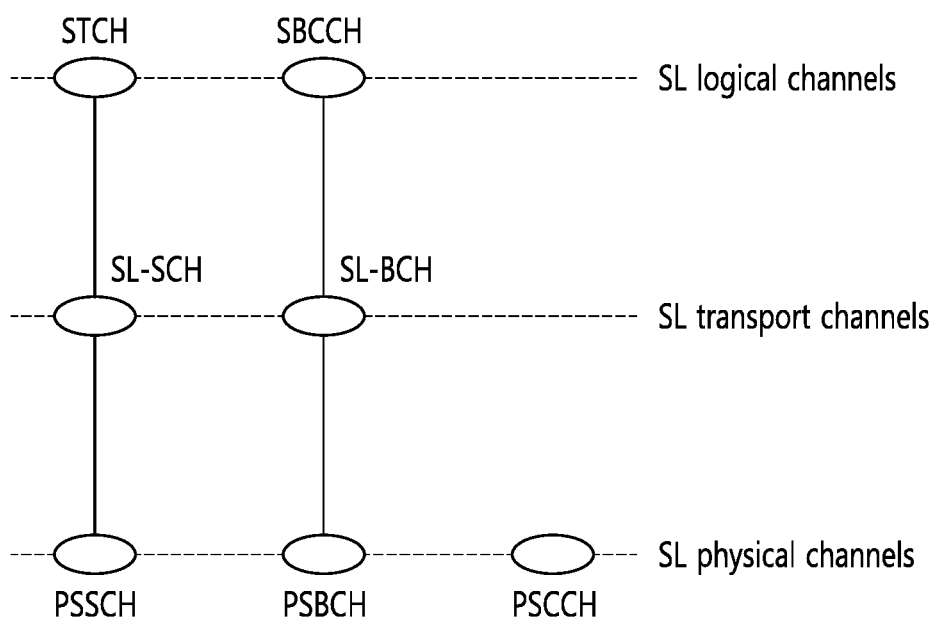
FIG. 9 is a diagram illustrating a mapping relation between channels related to a sidelink.

FIG. 9 is a drawing showing a mapping relation between channels related to sidelink. A logical channel for the sidelink (SL) may be defined as an SL traffic channel (STCH) for a data path and an SL broadcast control channel (SBCCH) for control signaling. The STCH is used to transmit user information for a ProSe application, and is mapped to an SL shared channel (SL-SCH) and a physical DL shared channel (PSSCH). The SBCCH is used to transmit a control signal or the like for synchronization, and is mapped to an SL broadcast channel (SL-BCH) and a physical SL broadcast channel (PSBCH). A physical SL control channel (PSCCH) corresponds to a PDCCH of cellular communication. Specifically, the PSCCH is used to transmit sidelink control information (SCI) which is control information required to receive and demodulate the PSSCH. The SCI information is transmitted before an STCH data block is transmitted.

Figure 10:
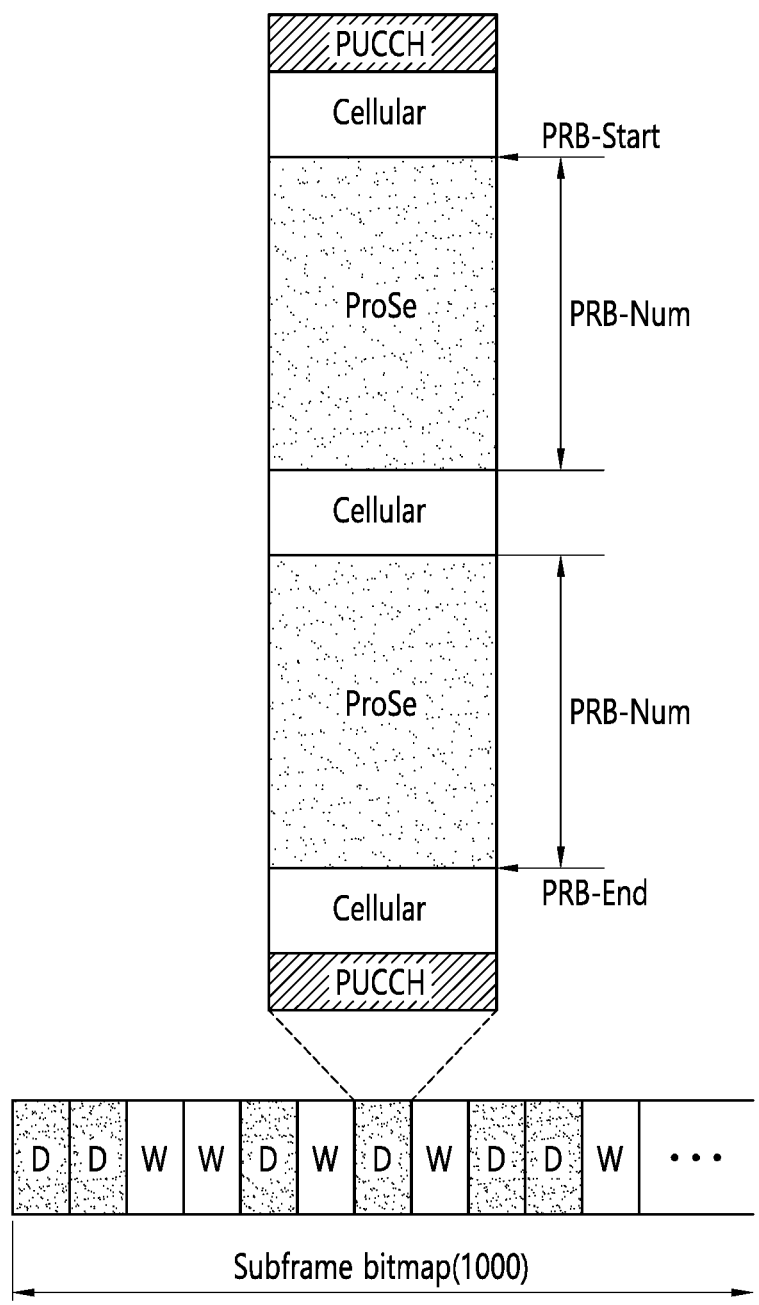
FIG. 10 illustrates an example of a resource pool for sidelink (SL) communication.

FIG. 10 shows an example of a resource pool for sidelink (SL) communication. The example of FIG. 10 shows an example in which a resource pool is configured on a subframe basis. However, the illustrated subframe may be replaced with another time unit (e.g., slot, symbol, or TTI). Based on the example of FIG. 10, whether a corresponding subframe is used for SL may be indicated depending on a subframe bitmap 1000. A pattern indicated depending on the subframe bitmap 1000 may be repeated.

Based on the example of FIG. 10, two frequency resources may be allocated for SL in one subframe, and each frequency resource may be indicated on a physical resource block (PRB) basis. Specifically, one frequency resource may start from PRB_start, and the other frequency resource may end at PRB_end. The number of PRBs occupied by each of the frequency resources may be PRB-Num. One UE is configured to use any one of a resource for sidelink/ProSe communication and a resource for cellular communication. A resource pool (RP) for SL communication may be divided into RX RP and TX RP. Each RP may be signaled by a BS. All TX RPs may be connected to at least one RX RP.

An RP allocation method may be divided into a mode 1 and a mode 2. In the mode 1, a BS may indicate a resource in a specific RP. In the mode 2, a UE may select a specific RP, and may select a resource from an allocated resource pool set. For the mode 1, the UE shall be in an RRC_connected state. However, the mode 2 may operate in an RRC_idle state or an out-of-coverage state. Details thereof will be described with reference to FIG. 11.

Figure 11:
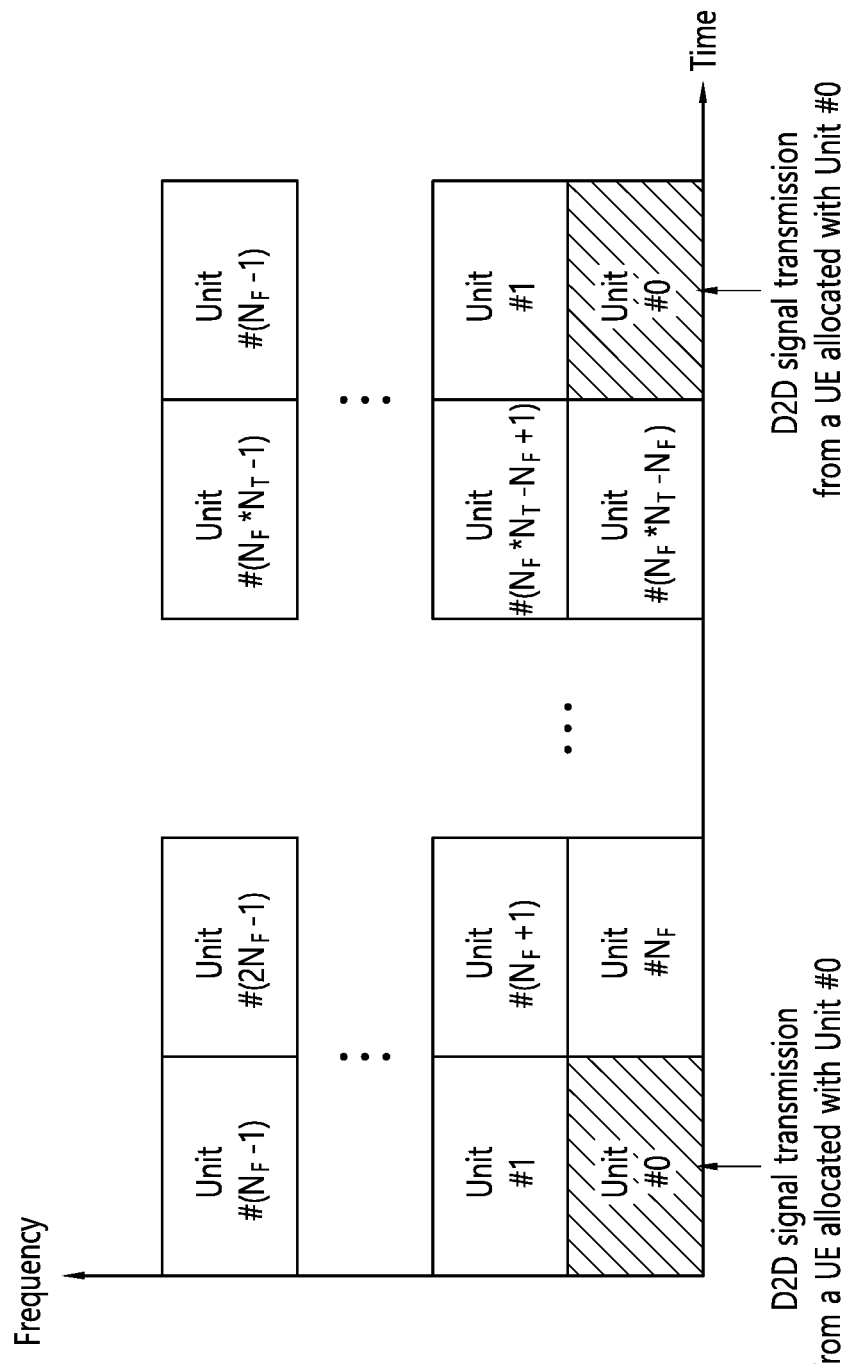
FIG. 11 illustrates another example of a resource pool for sidelink (SL) communication.

FIG. 11 shows another example of a resource pool for sidelink (SL) communication. The example of FIG. 11 may be used by a UE1 (i.e., transmitting UE) and UE2 (i.e., receiving UE) capable of performing communication through SL. In addition, when a network device such as an eNB transmits and receives a signal based on a communication scheme employed between UEs, the eNB may also be regarded as a kind of UE.

In the following description, the UE1 (transmitting UE) may operate to select a resource unit corresponding to a specific resource within a resource pool (RP) and to transmit a sidelink/D2D signal by using the corresponding resource unit. The UE2 (receiving UE) is configured for an RP to which the UE can transmit a signal, and detects the signal of the UE within the corresponding RP. If the UE1 is located within coverage of an eNB (i.e., in-coverage case), the RP may be informed by the eNB. On the other hand, if the UE is located outside the coverage of the eNB (i.e., a partial coverage or out-of-coverage case), the RP may be informed by another UE or may be determined as a predetermined resource. In general, the RP consists of a plurality of resource units, and each UE may select one or more resource units to transmit its sidelink/2D signal.

FIG. 11 shows an example of a resource unit. Herein, the entire frequency resource is divided into N_F units, and the entire time resource is divided into N_T units, and thus the total number of resource units is N_F*N_T. In other words, it may be assumed that an RP of FIG. 11 is repeated with a period of N_T subframes (or other time units). That is, one resource unit may be repeated periodically as shown in FIG. 11. Alternatively, in order to obtain a diversity effect in the time and/or frequency dimension, an index of a physical resource unit to which one logical resource unit is mapped may vary based on a predetermined pattern as time elapses. In this situation, an RP for sidelink/D2D communication may imply a set of resource units which may be used for transmission by a UE (i.e., transmitting UE) intending to transmit a sidelink/D2D signal.

The aforementioned RP may be subdivided into various types. First, the RP may be classified into various types based on content of a sidelink/D2D signal transmitted in each RP. For example, the content of the D2D signal may be divided as shown below, and a separate RP (i.e., individual or different RP) may be configured for each case.

Content Example #1: Scheduling Assignment (SA) or Sidelink/D2D Control Channel

A control channel described herein is used for a signal including a resource position of a sidelink/D2D data channel transmitted by each transmitting UE in the same or succeeding time unit (e.g., subframe, TTI, slot, symbol) and control information (e.g., at least any one of MCS, MIMO transmission scheme, information element such as timing advance or the like) required to demodulate a corresponding data channel. The aforementioned signal can be transmitted together with the sidelink/D2D data by being multiplexed on the same resource unit. In this case, an SA resource pool means a pool for a resource on which SA is transmitted by being multiplexed with the sidelink/D2D data. An SA control channel may be called a sidelink/D2D control channel or the like. The SA may correspond to the PSCCH described in FIG. 9.

Content Example #2: Sidelink/D2D Data Channel

An individual resource pool (RP) may be allocated for a sidelink/D2D data channel through which a transmitting UE transmits user data by using a resource designated through scheduling assignment (SA). The sidelink/D2D data channel may correspond to the PSSCH described above in FIG. 9. If it can be transmitted together with sidelink/D2D data by being multiplexed on the same resource unit, a resource pool (RP) for the sidelink/D2D data channel may be configured to transmit only the sidelink/D2D data channel configured by excluding SA information. In other words, a resource element used to transmit SA information on an individual resource unit in an SA RP is still used in an RP of the sidelink/D2D data channel to transmit sidelink/D2D data.

Content Example #3: Discovery Channel

A transmitting UE transmits information such as its identity (ID) or the like so that a neighboring UE discovers the transmitting UE. A message used in this case is transmitted through a discovery channel or a physical sidelink discovery channel (PSDCH). An individual resource pool (RP) may be allocated for a corresponding channel.

Although the aforementioned D2D signal carries the same content, a different resource pool (RP) may be utilized depending on transmission and reception attributes of the D2D signal. For example, although the same sidelink/D2D data channel or the same discovery message is transmitted, the RP may be further divided into another different RP depending on a scheme for determining transmission timing of the D2D signal (e.g., whether the D2D signal is transmitted at the time of receiving a synchronization reference signal or transmitted after a predetermined timing advance is applied at the time of receiving the synchronization reference signal), a resource allocation scheme (e.g., whether a transmission resource of an individual signal is allocated by a BS to each individual transmitting UE or whether an individual transmitting UE selects an individual signal transmission resource by itself within the resource pool), a signal format (e.g., the number of symbols occupied by each D2D signal in one subframe or the number of subframes used for the transmission of one D2D signal), strength of a signal from the BS, or transmission power intensity of a D2D UE. As described above, a method in which the BS directly indicates a transmission resource of the transmitting UE in sidelink/D2D communication may be called the mode 1, and a method in which a transmission resource region is predetermined or in which the BS designates the transmission resource region and the transmitting UE directly selects a transmission resource may be called the mode 2. In case of D2D discovery, a case where the BS directly indicates a resource may be called a type 2, and a case where the UE directly selects a transmission resource from a predetermined resource region or a resource region indicated by the BS may be called a type 1.

As described above, V2X communication may be implemented based on a sidelink based on the 3GPP standard, which may be called cellular-based V2X or cellular V2X (C-V2X). Meanwhile, V2X communication may be implemented based on the IEEE standard. For example, V2X communication may be implemented through dedicated short-range communications (DSRC) V2X based on the IEEE 802.11p standard or DSRC-based V2X.

An example of the disclosure may be applied to a situation in which C-V2X and DSRC coexist. That is, an apparatus (e.g., UE) based on an example of the disclosure may support the aforementioned sidelink and also support communication based on the IEEE 802.11p standard.

Hereinafter, basic technical characteristics of DSRC are described.

Figure 12:
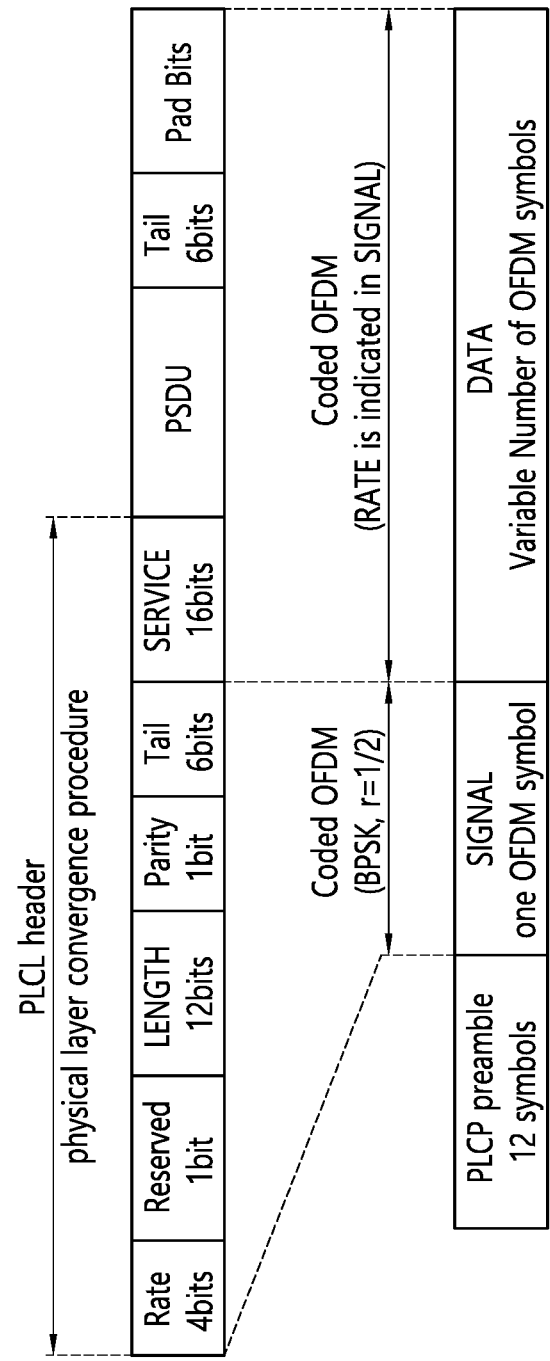
FIG. 12 is a diagram illustrating a frame format based on the IEEE 802.11p standard.

FIG. 12 is a diagram illustrating a frame format based on the IEEE 802.11p standard.

The frame based on the IEEE 802.11p standard operates on a 10 MHz band and supports various data rates based on a modulation scheme. Furthermore, in the frame, data transmission is performed on 5.9 GHz, a symbol is defined in an 8 us unit, and a guard interval (GI) having a length of 1.6 us is inserted.

The physical layer frame of the IEEE 802.11p standard may be defined like FIG. 12. Specifically, the frame may include a PHY layer convergence procedure (PLCP) header, may then include a PCLP service data unit (PSDU), and may include a tail and pad bits. Furthermore, as illustrated, the frame of FIG. 12 may first include a preamble composed of 12 symbols. The illustrated preamble may be used for AGC estimation or channel frequency offset (CFO) estimation.

Figure 13:
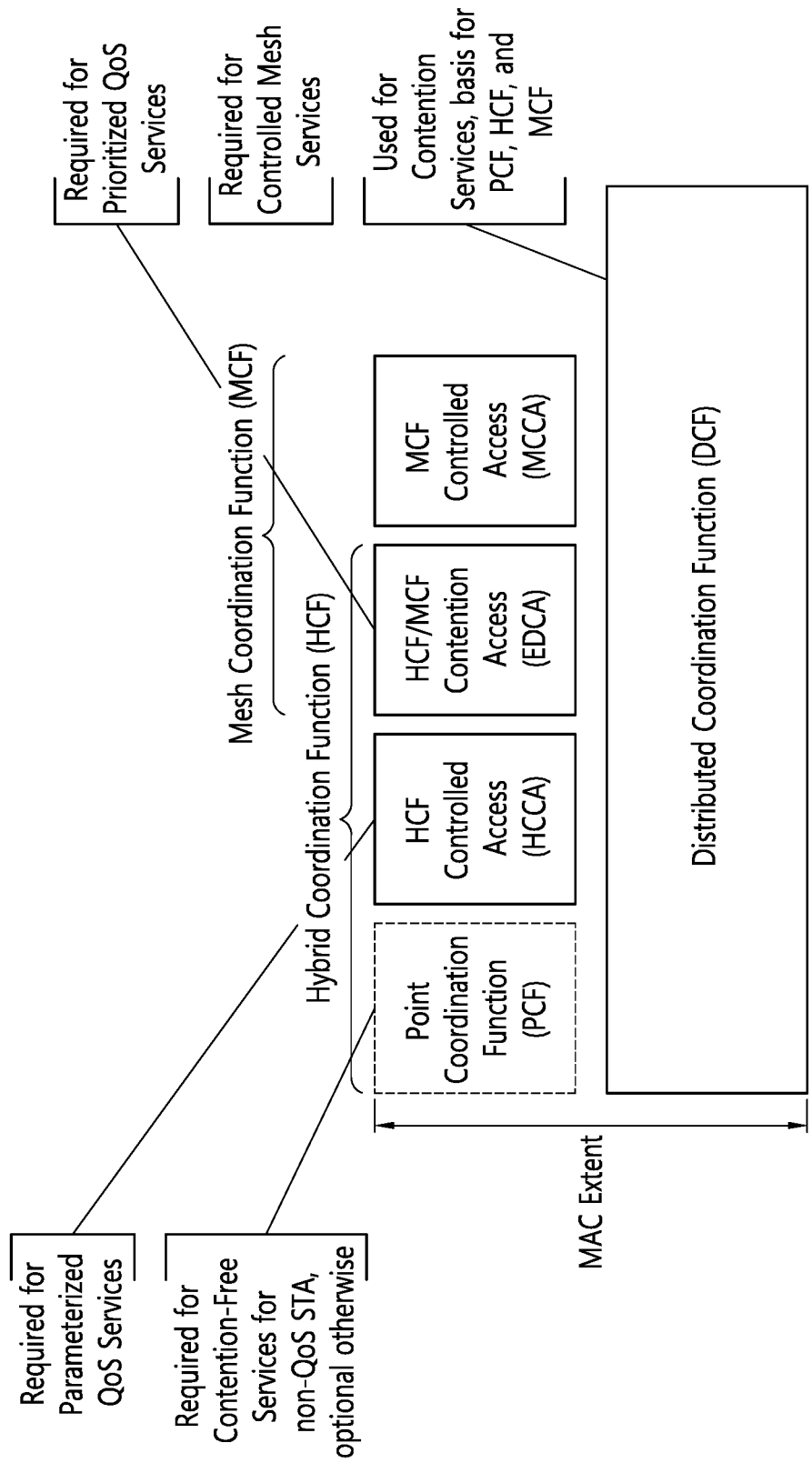
FIG. 13 is a diagram illustrating the functions of a MAC layer based on the IEEE 802.11p standard.

FIG. 13 is a diagram illustrating the functions of a MAC layer based on the IEEE 802.11p standard.

As illustrated, the MAC layer based on the IEEE 802.11p standard supports a distributed coordination function (DCF). Specifically, the MAC layer allows an STA to access a medium through a contention based on a carrier sense multiple access/collision avoidance (CSMA/CA) scheme.

The IEEE 802.11p technology supports a wireless access in vehicular environment (WAVE) standard in association with the IEEE 1609 technology. The WAVE standard is a kind of DSRC technology and supports vehicle-to-infrastructure (V2I) and vehicle-to-vehicle (V2V) communication.

The DSRC and/or the WAVE standard propose the access of an STA through a back-off operation widely used in a wireless LAN. Hereinafter, a back-off operation available in the IEEE standard (including DSRC and WAVE standard) is described.

Figure 14:
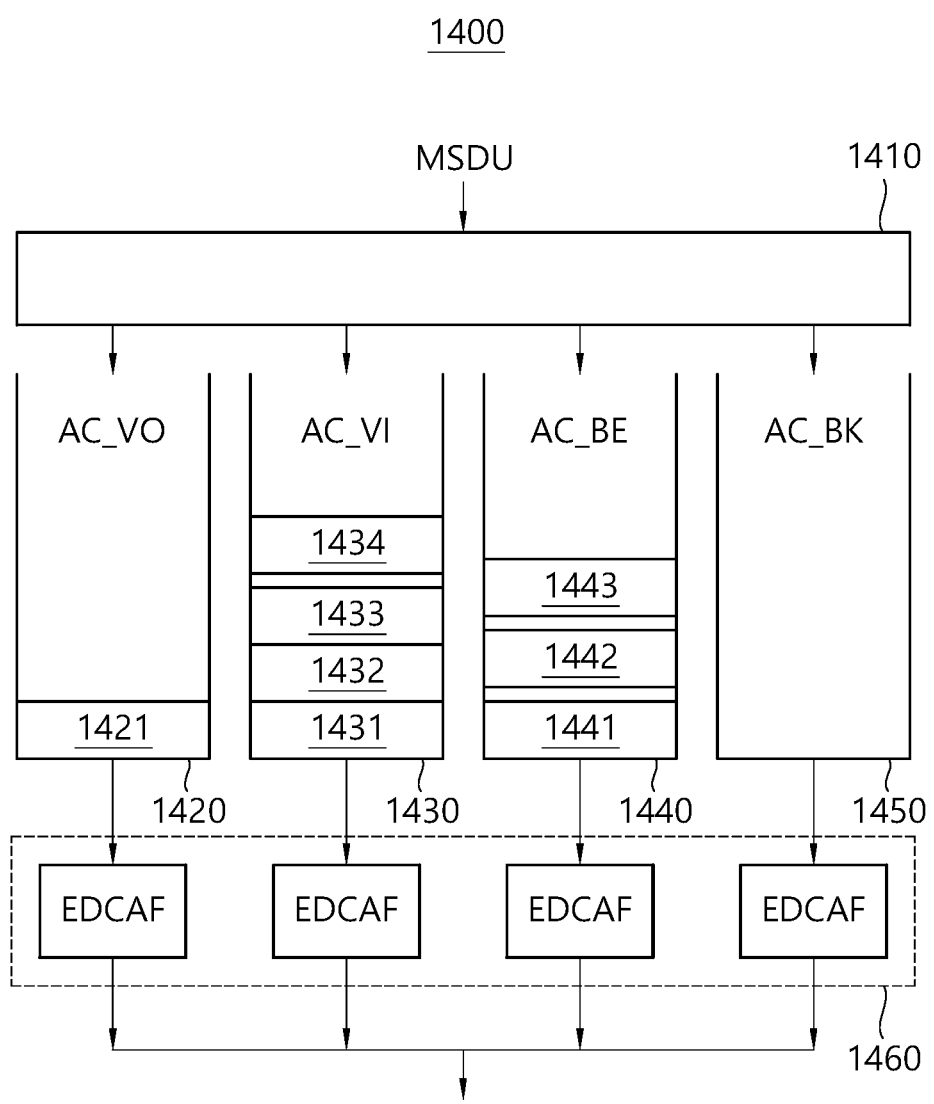
FIG. 14 is a diagram illustrating a channel access method based on EDCA.

FIG. 14 is a diagram illustrating a channel access method based on EDCA. In a wireless LAN system, an STA may perform channel access based on a plurality of user priorities defined for enhanced distributed channel access (EDCA).

Specifically, for the transmission of a quality of service (QoS) data frame based on a plurality of user priorities, four access categories (ACs) (AC_BK (background), AC_BE (best effort), AC_VI (video), and AC_VO (voice) may be defined.

An STA may receive, from a higher layer, traffic data (e.g., MAC service data unit (MSDU)) having a preset user priority.

For example, in order to determine the transmission sequence of a MAC frame to be transmitted by an STA, a differential value may be set in a user priority for each traffic data. The user priority may be mapped based on each access category (AC) in which traffic data is buffered and Table 4 below.

TABLE 4

| Priority | User priority | Access category (AC) |
| --- | --- | --- |
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

In the disclosure, the user priority may be understood as a traffic identifier (hereinafter "TID") indicating the characteristics of traffic data.

Referring to Table 4, traffic data having the user priority (i.e., TID) of "1" or "2" may be buffered in a transmission queue 1450 of an AC_BK type. Traffic data having the user priority (i.e., TID) of "0" or "3" may be buffered in a transmission queue 1440 of an AC_BE type.

Traffic data having the user priority (i.e., TID) of "4" or "5" may be buffered in a transmission queue 1430 of an AC_VI type. Traffic data having the user priority (i.e., TID) of "6" or "7" may be buffered in a transmission queue 1420 of an AC_VO type.

Instead of a DCF interframe space (DIFS), CWmin, and CWmax that are parameters for a back-off operation/procedure based on the existing distributed coordination function (DCF), an arbitration interframe space (AIFS)[AC], CWmin [AC], CWmax[AC] and TXOP limit[AC] that are EDCA parameter sets may be used for a back-off operation/procedure of an STA performing EDCA.

A difference between transmission priorities of ACs may be implemented based on a differentiated EDCA parameter set. A default value of the EDCA parameter set (i.e., AIFS [AC], CWmin[AC], CWmax[AC], and TXOP limit[AC]) corresponding to each AC is illustratively shown in Table 5. Detailed values of Table 5 may be set differently from those listed below.

TABLE 5

| AC | CWmin[AC] | CWmax[AC] | the AIFS[AC] | TXOP limit[AC] |
| --- | --- | --- | --- | --- |
| AC_BK | 31 | 1023 | 7 | 0 |
| AC_BE | 31 | 1023 | 3 | 0 |
| AC_VI | 15 | 31 | 2 | 3.008 ms |
| AC_VO | 7 | 15 | 2 | 1.504 ms |

The EDCA parameter set for each AC may be set as a default value or may be included in a beacon frame and transmitted from an access point (AP) to each STA. The smaller the values of the AIFS [AC] and the CWmin[AC], the higher the priorities. Accordingly, a more band can be used in a given traffic environment because channel access latency is reduced.

The EDCA parameter set may include information on a channel access parameter (e.g., AIFS [AC], CWmin[AC], and CWmax[AC]) for each AC.

A back-off operation/procedure for EDCA may be performed based on an EDCA parameter set individually set in each of the four ACs included in each STA. Proper setting of an EDCA parameter value that defines a different channel access parameter for each AC can optimize network performance and also increase a transmission effect based on the priority of traffic.

Accordingly, in a wireless LAN system, an AP needs to perform an overall management and coordination function on the EDCA parameters in order to guarantee fair medium access for all STAs participating in a network.

Referring to FIG. 14, one STA (or AP) 1400 may include a virtual mapper 1410, the plurality of transmission queues 1420~1450 and a virtual collision processor 1460. In FIG. 14, the virtual mapper 1410 may function to map an MSDU, received from a logical link control (LLC) layer, onto a transmission queue corresponding to each AC based on Table 1.

In FIG. 14, each of the plurality of transmission queues 1420~1450 may play a role of an EDCA contention entity for wireless medium access within one STA (or AP).

Figure 15:
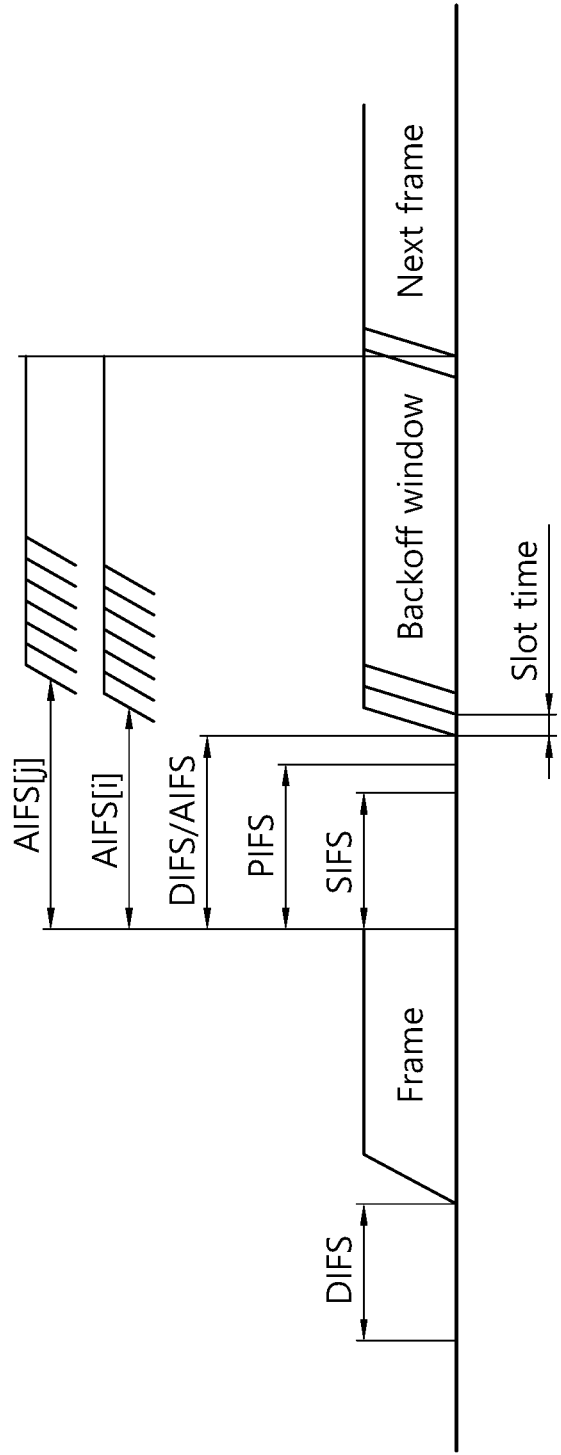
FIG. 15 is a concept view illustrating a back-off operation/procedure of EDCA.

FIG. 15 is a concept view illustrating a back-off operation/procedure of EDCA.

A plurality of STAs may share a wireless medium based on a DCF, that is, a contention-based function. The DCF may use CSMA/CA in order to coordinate a collision between STAs.

In a channel access scheme using the DCF, if a medium is not used (i.e., channel is idle) during a DCF interframe space (DIFS), an STA may transmit an internally determined MPDU. The DIFS is a kind of time length used in the IEEE standard. The IEEE standard uses various time intervals, such as a slot time, a short inter-frame space (SIFS), a PCF inter-frame space (PIFS), a DIFS, and an arbitration inter-frame space (AIFS). A detailed value of each of the time intervals may be variously set. In general, a long length is set in order of the slot time, SIFS, PIFS, DIFS, and AIFS.

If it is determined that a wireless medium is used by another STA based on the carrier sensing mechanism of an STA (i.e., channel is busy), the STA may determine the size of a contention window (hereinafter "CW") and perform a back-off operation/procedure.

In order to perform a back-off operation/procedure, each STA may set a randomly selected back-off value in a back-off counter within a CW.

Each STA may perform a back-off operation/procedure for channel access by counting down a back-off window in a slot time unit. An STA that has selects a relatively shorter back-off window among a plurality of STAs may obtain a transmission opportunity (hereinafter "TXOP") capable of occupying a medium.

During a time interval for the TXOP, the remaining STAs may suspend countdown operations. The remaining STAs may wait until the time interval for the TXOP is ended. After the time interval for the TXOP is ended, the remaining STAs may resume the suspended countdown operations in order to occupy the wireless medium.

Based on a transmission method based on such a DCF, a collision phenomenon which may occur when a plurality of STAs transmits frames at the same time can be prevented. In this case, a channel access scheme using the DCF does not have a concept for a transmission priority (i.e., user priority). That is, when the DCF is used, quality of service (QoS) of traffic to be transmitted by an STA cannot be guaranteed.

In order to solve such a problem, in 802.11e, a hybrid coordination function (hereinafter "HCF"), that is, a new coordination function, has been defined. The newly defined HCF has better performance than channel access performance of the existing DCF. The HCF may use both HCF-controlled channel access (HCCA) of the polling scheme and contention-based enhanced distributed channel access (EDCA), that is, two types of channel access schemes, for QoS improvement purposes.

Referring to FIG. 15, it is assumed that an STA performs EDCA for the transmission of traffic data buffered in the STA. Referring to Table 5, a user priority set in each traffic data may be differentiated into eight stages.

Each STA may include output queues of the four types (AC_BK, AC_BE, AC_VI, and AC_VO) mapped onto the eight-stage user priorities of Table 4.

IFSs, such as the SIFS, the PIFS, and the DIFS, are additionally described below.

The IFS may be determined based on the attributes specified by the physical layer of an STA regardless of the bit rate of the STA. The remainder except the AIFS among the interframe spacings (IFSs) may fixedly use a value preset for each physical layer.

As illustrated in Table 5, the AIFS may be set as a value corresponding to the transmission queues of the four types mapped onto user priorities.

The SIFS has the shortest time gap among the aforementioned IFSs. Accordingly, the SIFS may be used when an STA occupying a wireless medium needs to maintain the occupancy of the medium without the interruption of another STA in an interval in which a frame exchange sequence is performed.

That is, a priority may be assigned when an on-going frame exchange sequence is completed using the smallest gap between transmissions within the frame exchange sequence. Furthermore, an STA accessing a wireless medium using the SIFS may immediately start transmission in an SIFS boundary without determining whether the medium is busy.

Duration of the SIFS for a specific physical (PHY) layer may be defined based on an aSIFSTime parameter. For example, an SIFS value is 16μs in the physical layer (PHY) of the IEEE 802.11a, IEEE 802.11g, IEEE 802.11n and IEEE 802.11ac standards.

The PIFS may be used to provide an STA with a high priority next the SIFS. That is, the PIFS may be used to obtain a priority for accessing a wireless medium.

The DIFS may be used by an STA that transmits a data frame (MPDU) and a management frame (Mac protocol data unit (MPDU)) based on the DCF. After a received frame and a back-off time expires, if a medium is determined to be in the idle state through a carrier sense (CS) mechanism, the STA may transmit the frame.

Figure 16:
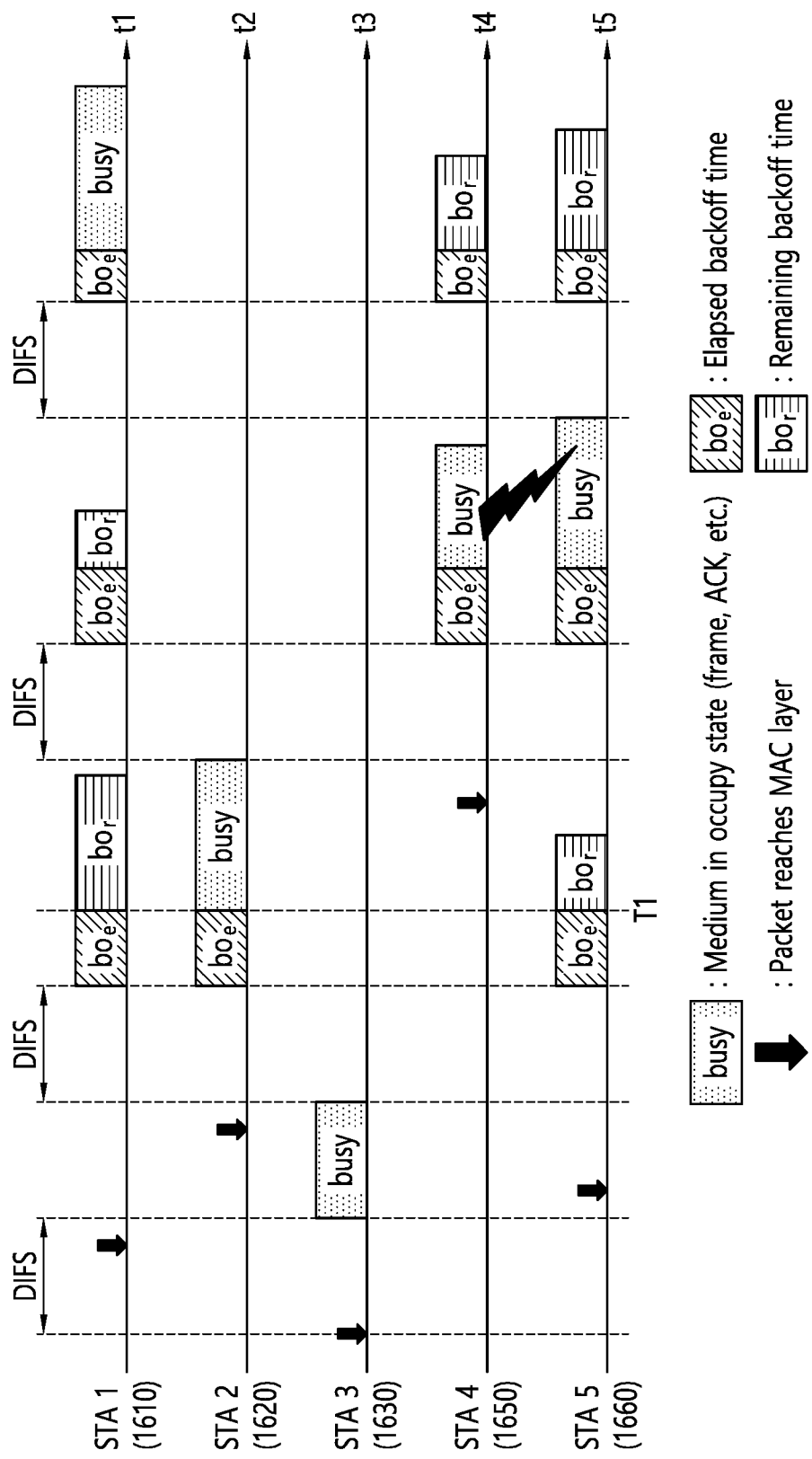
FIG. 16 is a diagram describing a back-off operation.

FIG. 16 is a diagram describing a back-off operation.

Each of STAs 1610, 1620, 1630, 1640, and 1650 may select a back-off value for a back-off operation/procedure. Furthermore, each STA may attempt transmission after waiting as much as time (i.e., a back-off window) in which the selected back-off value is indicated in a slot time slot time unit. Furthermore, each STA may count down a back-off window in a slot time unit. A countdown operation for channel access to a wireless medium may be individually performed by each STA.

Time corresponding to the back-off window may be described as a random back-off time Tb[i]. In other words, each STA may individually set the back-off time Tb[i] in the back-off counter of each STA.

Specifically, the back-off time Tb[i] is a pseudo-random integer value, and may be computed based on Equation 1.

$$T_b[i] = \text{Random}(i) * \text{SlotTime} \qquad [\text{Equation 1}]$$

In Equation 1, Random(i) is a function using a uniform distribution and generating a given integer between 0 and CW[i]. CW[i] may be understood as a contention window selected between a minimum contention window CWmin[i] and a maximum contention window CWmax[i]. The minimum contention window CWmin[i] and the maximum contention window CWmax[i] may correspond to CWmin[AC] and CWmax[AC], that is, default values in Table 5.

In initial channel access, an STA may select a given integer between 0 and CWmin[i] through Random(i) with CW[i] being fixed to CWmin[i]. In the present embodiment, the selected given integer may be described as a back-off value.

i may be understood as the user priority of traffic data. In Equation 1, i may be construed as corresponding to any one of AC_VO, AC_VI, AC_BE or AC_BK according to Table 4.

In Equation 1, the slot time SlotTime may be used to provide a sufficient time so that the preamble of a transmission STA is sufficiently detected by an adjacent STA. In Equation 1, the slot time SlotTime may be used to define the aforementioned PIFS and DIFS. For example, the slot time SlotTime may be 9 μs.

For example, when a user priority(i) is "7", an initial back-off time Tb[AC_VO] for the transmission queue of the AC_VO type may be time in which a back-off value selected between 0 and CWmin[AC_VO] is represented in unit of the slot time SlotTime.

If a collision between STAs occurs according to a back-off operation/procedure (or if an ACK frame for a transmitted frame is not received), an STA may compute an increased back-off time Tb[i]' based on Equation 2 below.

$$CW_{new}[i]=((CWold[i]+1)*PF)-1 \quad \text{[Equation 2]}$$

Referring to Equation 2, a new contention window $CW_{new}$ [i] may be computed based on a previous window $CW_{old}$[i]. In Equation 2, the PF value may be computed according to a procedure defined in the IEEE 802.11e standard. For example, in Equation 2, the PF value may be set to "2."

In the present embodiment, the increased back-off time Tb[i]' may be understood as time in which a given integer (i.e., a back-off value) selected between 0 and the new contention window $CW_{new}$[i] is represented in a slot time unit.

The CWmin[i], CWmax[i], AIFS[i] and PF values described in FIG. 16 may be signaled from an AP through a QoS parameter set element, that is, a management frame. The CWmin[i], CWmax[i], AIFS[i] and PF values may be values preset by an AP and an STA.

Referring to FIG. 16, if the state of a specific medium changes from an occupy (or busy) state to an idle state, a plurality of STAs may attempt data (or frame) transmission. In this case, as a scheme for minimizing a collision between the STAs, each STA may select a back-off time back-off time Tb[i] in Equation 1, may wait for a slot time corresponding to the selected back-off time back-off, and may then attempt transmission.

When a back-off operation/procedure is initiated, each STA may individually count down the selected back-off counter time in a slot time unit. Each STA may continuously monitor the medium during the countdown.

If the state of the wireless medium is monitored as the occupancy state, the STA may suspend the countdown and may wait. If the state of the wireless medium is monitored as the idle state, the STA may resume the countdown.

Referring to FIG. 16, when a frame for the third STA 1630 reaches the MAC layer of the third STA 1630, the third STA 1630 may check whether the state of a medium is the idle state during a DIFS. Next, if the state of the medium is determined to be the idle state during the DIFS, the third STA 1630 may transmit the frame.

While the frame is transmitted by the third STA 1630, the remaining STAs may check the occupancy state of the medium and wait for the transmission interval of the frame. The frame may reach the MAC layer of each of the first STA 1610, the second STA 1620 and the fifth STA 1660. If the state of the medium is checked as the idle state, each STA may wait for the DIFS and then count down an individual back-off time selected by each STA.

FIG. 16 illustrates a case where the second STA 1620 has selected the smallest back-off time and the first STA 1610 has selected the greatest back-off time. FIG. 16 illustrates a case where at timing T1 at which frame transmission is started after a back-off operation/procedure for a back-off time selected by the second STA 1620 is terminated, the remaining back-off time of the fifth STA 1660 is shorter than the remaining back-off time of the first STA 1610.

When the medium is occupied by the second STA 1620, the first STA 1610 and the fifth STA 1660 may suspend the back-off operation/procedures and may wait. Next, when the medium occupancy of the second STA 1620 is ended (i.e., when the state of the medium becomes the idle state again), the first STA 1610 and the fifth STA 1660 may wait as much as the DIFS.

Next, the first STA 1610 and the fifth STA 1660 may resume the back-off operation/procedures based on the suspended remaining back-off time. In this case, since the remaining back-off time of the fifth STA 1660 is shorter than the remaining back-off time of the first STA 1610, the fifth STA 1660 may complete the back-off operation/procedure before the first STA 1610.

Meanwhile, referring to FIG. 16, when the medium is occupied by the second STA 1620, a frame for the fourth STA 1650 may reach the MAC layer of the fourth STA 1650. When the state of the medium becomes the idle state, the fourth STA 1650 may wait as much as the DIFS. Next, the fourth STA 1650 may count down a back-off time selected by the fourth STA 1650.

Referring to FIG. 16, the remaining back-off time of the fifth STA 1660 may coincide with the back-off time of the fourth STA 1650. In this case, a collision occurs between the fourth STA 1650 and the fifth STA 1660. When the collision between the STAs occurs, both the fourth STA 1650 and the fifth STA 1660 do not receive ACK and may fail in data transmission.

Accordingly, the fourth STA 1650 and the fifth STA 1660 may individually compute new contention windows CWnew [i] according to Equation 2. Next, the fourth STA 1650 and the fifth STA 1660 may individually perform countdown on the back-off times newly computed according to Equation 2.

Meanwhile, when the state of the medium is the occupancy state due to the transmission of the fourth STA 1650 and the fifth STA 1660, the first STA 1610 may wait. Next, when the state of the medium becomes the idle state, the first STA 1610 may wait as much as the DIFS and then resume back-off counting. When the remaining back-off time of the first STA 1610 elapses, the first STA 1610 may transmit the frame.

The disclosure proposes a UE/STA (hereinafter referred to as a "UE") that performs transmission/reception using standalone CSMA based on the aforementioned CSMA scheme. The CSMA scheme used in the disclosure may support some or/all the technical characteristics of the operations of FIGS. 14 to 16. In some of the following examples, a term "CSMA" is used for convenience of a description, but in an example of the disclosure, another term not "CSMA" may be represented.

Meanwhile, a UE proposed in the disclosure needs to support a plurality of carriers. In the disclosure, a carrier is a radio resource including at least one subcarrier. For example, the carrier may be configured with at least one RB, may be configured with a plurality of contiguous RBs or may be configured with a plurality of previously signaled RBs. Furthermore, one carrier may correspond to one cell according to a conventional LTE standard and may correspond to one component carrier. Furthermore, one carrier may be a bandwidth part (BWP) defined according to the NR standard, and may be a set of frequency resources according to one identical subcarrier spacing or numerology. Accordingly, a first carrier may be a first BWP or may be a set of frequency resources defined based on a first numerology. A second carrier may be a second BWP or may be a set of frequency resources defined based on a second numerology. Attributes (e.g., numerology and frequency band) applied to the first carrier may be identical with or different from attributes applied to the second carrier. One of the first carrier and the second carrier may support the aforementioned C-V2X or sidelink, and the other thereof may support DSRC communication. Furthermore, both the first and second carriers may support the aforementioned C-V2X or DSRC communication.

In the disclosure, a UE can efficiently use a frequency band because it supports a plurality of carriers. For example, even in a cellular communication system such as the 3GPP LTE/NR system, an unlicensed band, such as a 2.4 GHz band chiefly used in the existing WiFi system or an unlicensed band, such as newly spotlighted 5 GHz and 60 GHz bands, may be used for traffic offloading. Basically, the unlicensed band assumes a method for wireless transmission and reception through a contention between communication nodes. Accordingly, each communication node needs to perform channel sensing before it transmits a signal so that another communication node does not perform signal transmission. A procedure for confirming that another communication node does not perform signal transmission may be called a listen before talk (LBT) or channel access procedure. In this process, a UE may perform carrier sensing (CS) for checking whether signal transmission has been performed on a specific carrier (e.g., 2.4 GHz, 5 GHz or 60 GHz). For example, a UE (or a base station) may perform CS based on a clear channel assessment (CCA) scheme. For example, in the WiFi standard (801.11ac), a CCA critical value has been defined as −62 dBm for a non-WiFi signal and −82 dBm for a WiFi signal. This means that an STA or AP does not perform signal transmission so that interference does not occur when signal other than WiFi is received with power of −62 dBm, for example.

In other words, a UE supports a plurality of carriers and performs communication based on the first carrier, and may use the second carrier for various purposes (e.g., offloading). In order to use the second carrier, a modified CSMA scheme proposed in the disclosure may be used for the second carrier. The scheme proposed in the disclosure may be applied to another carrier in addition to the second carrier, and may be applied to a carrier related to C-V2X or a carrier related to DSCRV communication as described above.

The disclosure has a technical effect of preventing a self-interference problem while supporting a plurality of carriers. Hereinafter, the self-interference problem is described.

Figure 17:
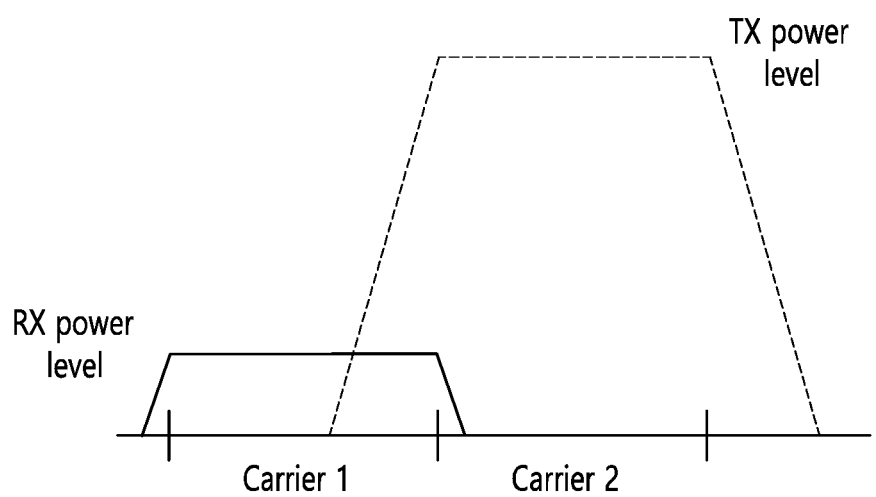
FIG. 17 is a diagram illustrating a situation in which transmission and reception are performed at the same time on a plurality of carriers.

FIG. 17 is a diagram illustrating a situation in which transmission and reception are performed at the same time on a plurality of carriers.

A case where one UE supports a plurality of carriers and stand-alone (or individual) CSMA is performed in each carrier may be assumed. For example, if a plurality of carriers is located in relatively neighbor frequencies and transmission is performed in any one carrier, interference may be caused in a surrounding carrier due to such transmission. Furthermore, such interference may hinder reception in another carrier and may make impossible signal reception in another carrier.

That is, as illustrated in FIG. 17, a UE may receive a radio signal in the first carrier (Carrier 1). Typically, a received signal has relatively low power because it reaches a UE after passing through a given distance. If the same UE transmits a radio signal in the second carrier (Carrier 2), part of transmission power may pass over to a neighbor carrier. In general, the size of passed-over power may be very greater than received power because transmission and reception antennas included in a UE are closely located. Furthermore, if the size of the transmission power is very greater than the received power, the transmission of a signal by the UE may operate as severe interference. This may be named self-interference. The UE cannot receive a signal normally through the first carrier (Carrier 1) due to such self-interference.

An example of the disclosure can solve such a self-interference problem. Specifically, in an example of the disclosure, when a UE receives a radio signal in at least one carrier (e.g., first carrier), the UE controls signal transmission at least another carrier (e.g., second carrier) which may cause self-interference due to signal reception. For example, the UE does not transmit a signal in the second carrier or control the transmission frequency of a signal. Additionally or alternatively, the UE can control transmission power in the second carrier.

Figure 18:
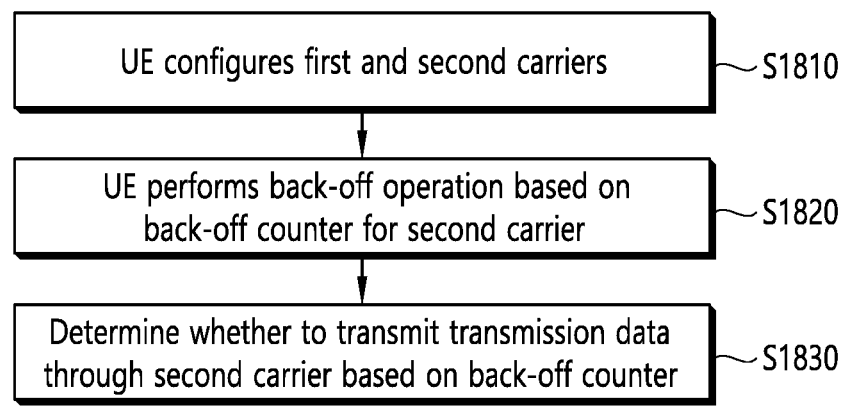
FIG. 18 illustrates a procedure flowchart based on an example of the disclosure.

FIG. 18 illustrates a procedure flowchart based on an example of the disclosure.

A UE may perform a configuration for a plurality of carriers including first and second carriers (S1810). As described above, one carrier may be configured as a radio resource including at least one subcarrier. For example, one carrier may be configured with at least one RB, may be configured with a plurality of contiguous RBs or may be configured with a plurality of previously signaled RBs. Furthermore, as described above, one carrier may include a set of frequency resources based on a cell, a BWP and/or a numerology. That is, the first carrier may be based on a first cell, a first BWP and/or a first numerology. The second carrier may be based on a second cell, a second BWP and/or a second numerology. Furthermore, as described above, one of the first carrier and the second carrier may support the aforementioned C-V2X or sidelink, and the other thereof may support DSRC communication. Furthermore, both the first and second carriers may support the aforementioned C-V2X or DSCRV communication. Hereinafter, for convenience of a description, the second carrier is described as being based on a mobile communication standard based on the 3GPP LTE or 3GPP NR standard. That is, in the following example, the second carrier may be used for a sidelink.

The UE may perform a configuration for the first carrier and a configuration for the second carrier at the same time or sequentially (S1810). The configuration for a carrier includes a procedure for transmitting/receiving data through the corresponding carrier. For example, the configuration for a carrier may include a procedure for obtaining synchronization for sidelink communication. Furthermore, for communications based on the IEEE 802.11p standard, the configuration for a carrier may include a procedure for transmitting/receiving a probe request/response signal in a beacon signal. Furthermore, for a connection between a UE and a base station, the configuration for a carrier may include an operation of performing initial access or receiving an RRC signal or MAC message.

Thereafter, the UE may perform a back-off operation on the second carrier (S1820). The back-off operation may be performed based on a back-off counter. The back-off counter may be set for at least one carrier. For example, if the UE performs a back-off operation on the first carrier and the second carrier, the UE may set a first back-off counter for the first carrier and set a second back-off counter for the second carrier. Meanwhile, the back-off operation S1820 may be performed on the first carrier in addition to the second carrier. Hereinafter, the back-off operation performed on the second carrier is described, but the same characteristics may also be applied to a back-off operation performed on the first carrier.

A value of the back-off counter may be determined as an integer. A value of the back-off counter may be decreased based on a predetermined time unit (e.g., slot, symbol, subframe, SIFS or DIFS). An initial value of the back-off counter may be determined based on various methods. For example, the initial value of the back-off counter may be set based on a control signal (e.g., RRC, MAC, PDCCH, beacon, probe request/response, association request/response) previously received through the first carrier and/or the second carrier. Furthermore, the initial value of the back-off counter may be randomly determined based on information of a previously received control signal. For example, the information of the previously received control signal may indicate the upper and/or lower limit of the initial value of the back-off counter. The UE may select an initial value of the back-off counter based on the indicated upper and/or lower limit. Additionally or alternatively, the initial value of the back-off counter may be determined based on the priority, size, type, etc. of data received in the first carrier, or may be determined based on the priority, size, type, etc. of data transmitted in the second carrier. Accordingly, the UE may set an initial value of the back-off counter based on at least any one piece of information of a previously received control signal, reception data and/or transmission data.

When the back-off operation S1820 is performed, a value of the back-off counter is counted down from the initial value of the back-off counter. For example, a value of the back-off counter may be counted down up to a preset value (e.g., "0").

The back-off operation S1820 may be performed based on the state of the first carrier and/or the state of the second carrier. That is, the UE may determine whether to decrease a value of the back-off counter based on the state of the first carrier and/or the state of the second carrier. The state of a carrier may be determined based on whether data is received through the carrier and/or whether power/energy of a specific critical value or more is measured through the carrier. The state of a carrier may be determined based on a predetermined time unit (e.g., slot, symbol, subframe, SIFS or DIFS). That is, the UE may obtain the state of a carrier based on a predetermined time unit, and a detailed example thereof is described with reference to FIG. 19.

The back-off operation S1820 is used to determine whether to transmit transmission data through at least one carrier. That is, the UE may determine whether to transmit transmission data through the second carrier based on the back-off counter (S1830). For example, when a value of the back-off counter reaches a specific value (e.g., "0"), the UE may transmit the transmission data through the second carrier. If a value of the back-off counter does not reach a specific value, the UE may wait without transmitting the transmission data through the second carrier.

Figure 19:
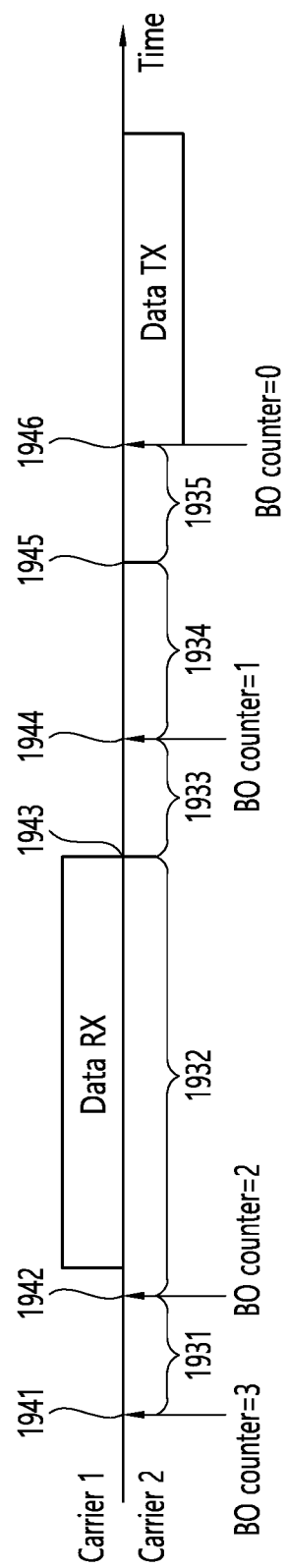
FIG. 19 is a diagram illustrating an example of the present disclosure.

FIG. 19 is a diagram illustrating an example of the present disclosure. FIG. 19 proposes a detailed example of a back-off operation. The example of FIG. 19 illustrates an example in which a back-off operation for the second carrier (e.g., operation of decreasing a value of a back-off counter for the second carrier) is performed based on a state of the first carrier (e.g., whether reception data is received through the first carrier) and a state of the second carrier (e.g., whether the second carrier is determined to be busy or idle).

The example of FIG. 19 is described in brief below. It is preferred that a UE does not perform transmission through the second carrier if it is receiving a signal in the first carrier (Carrier1). To this end, the UE may not decrease a back-off counter for the second carrier during a given time. For example, a time interval in which the back-off counter is not decreased may include a time interval in which the UE terminates signal reception in the first carrier.

The example of FIG. 19 is more specifically described below. The UE may start a back-off operation after checking that transmission data to be transmitted through the second carrier has occurred. When the back-off operation starts, the UE may set an initial value of the back-off counter based on the aforementioned various scheme (for the second carrier).

The example of FIG. 19 is an example in which the initial value of the back-off counter has been set to "3." That is, in FIG. 19, at timing 1941, the back-off counter within the UE is set to "3."

In the example of FIG. 19, the back-off counter is decreased based on a preset time unit (e.g., slot, symbol, subframe, SIFS or DIFS). In FIG. 19, an interval from the timing 1941 to timing 1942 (i.e., interval 1931 in FIG. 19) may be a "preset time unit." That is, during the interval 1931, whether to decrease a value of the back-off counter may be determined based on a state of the first carrier (e.g., whether reception data is received through the first carrier) and a state of the second carrier (e.g., whether the second carrier is determined to be busy or idle). In the example of FIG. 19, the UE decreases the value of the back-off counter because reception data has not been received through the first carrier and the second carrier has been determined to be idle during the interval 1931. Accordingly, at the timing 1942 in FIG. 19, the value of the back-off counter becomes "2."

At the timing 1942 in FIG. 19, the UE checks a state of the first/second carrier during a "preset time unit." In the example of FIG. 19, at the timing 1942, the reception of data is performed in the first carrier. If a signal has not been received through the first carrier and at the same time, the second carrier has been determined to be idle during the "preset time unit" after the timing 1942, the UE may have additionally decreased the value of the back-off counter. In the example of FIG. 19, however, the value of the back-off counter is not decreased during the interval 1932 because a signal has been received through the first carrier during the interval 1932.

The UE checks whether a condition in which the back-off counter will be decreased is satisfied during a "preset time unit" from timing (i.e., timing 1943 in FIG. 19) at which the reception of the signal (i.e., reception data) through the first carrier is ended. In the example of FIG. 19, the condition in which the back-off counter will be decreased is satisfied during an interval (i.e., interval 1933) from the timing 1943 to timing 1944. That is, the UE decreases the value of the back-off counter because a signal has not been received through the first carrier and at the same time, the second carrier has been determined to be idle during the interval 1933 (i.e., interval corresponding to the "preset time unit") in FIG. 19. Accordingly, at the timing 1944 in FIG. 19, the value of the back-off counter becomes "1."

In the example of FIG. 19, the second carrier is determined to be busy from the timing 1944 (or from timing after a lapse of a given time from the timing 1944). Accordingly, the UE does not decrease the value of the back-off counter until the interval in which the second carrier is determined to be busy is ended. In FIG. 19, the UE does not decrease the value of the back-off counter during an interval 1934 (i.e., from the timing 1944 to timing 1945) because the second carrier has been determined to be busy up to the timing 1945.

In the example of FIG. 19, the UE determines the second carrier to be idle from the timing 1945. Accordingly, the UE checks whether a condition in which the back-off counter will be decreased is satisfied during a "preset time unit" from the timing 1945. In the example of FIG. 19, the condition in which the back-off counter will be decreased is satisfied during the interval (i.e., interval 1935) from the timing 1945 to timing 1946. That is, the UE decreases the value of the back-off counter because a signal has not been received through the first carrier and at the same time, the second carrier has been determined to be idle during the interval 1935 (i.e., interval corresponding to the "preset time unit")

in FIG. 19. Accordingly, at the timing 1946 in FIG. 19, the value of the back-off counter becomes "0."

The example of FIG. 19 may be represented as follows. If reception data is not received through the first carrier and the second carrier is idle, the UE may decrease a value of the back-off counter. Furthermore, if reception data is not received through the first carrier and the second carrier is idle during a "preset time unit", the UE may decrease a value of the back-off counter. For example, it is preferred that if reception data is received through the first carrier, a value of the back-off counter is not decreased regardless of a state of the second carrier. That is, after the reception of the reception data through the first carrier is ended, the UE newly determines whether reception data is not received through the first carrier and the second carrier is idle during a "preset time unit." Furthermore, if the second carrier is determined to be busy, it is preferred that a value of the back-off counter is not decreased regardless of a state of the first carrier. That is, after the second carrier is determined to be idle, the UE may newly determine whether reception data is not received through the first carrier and the second carrier is idle during a "preset time unit."

In the example of FIG. 19, the UE may start the transmission of transmission data at the timing 1946 because a value of the back-off counter has become "0" at the timing 1946. As a result, a result in which the transmission of transmission data occurred prior to the timing 1941 is delayed occurs by considering the states of the first and second carriers. Accordingly, the UE can achieve an advantageous effect for decreasing self-interference between the first and second carriers.

The example of FIG. 19 is merely an example of the disclosure, and all of the detailed technical characteristics of FIG. 19 are not essential characteristics. The detailed characteristics of FIG. 19 may be changed as follows.

The example of FIG. 19 may be changed as follows. For example, although a value of the back-off counter for the second carrier is "0", the UE may start data transmission after a given time (e.g., at least one slot, symbol, subframe, SIFS or DIFS). Accordingly, the UE can secure time for transition between transmission/reception operations, and the transmission/reception of a subsequent signal on the first carrier (e.g., transmission/reception of ACK/NACK signals for the existing signal) can be protected.

Additionally or alternatively, the example of FIG. 19 may be changed as follows. For example, although a signal is receiving in the first carrier, the UE may perform a sensing operation (i.e., idle/busy sensing operation) in the second carrier without change, and may decrease a value of the back-off counter if the second carrier is determined to be idle. In this case, after such an operation, the UE delays transmission for a given time although the value of the back-off counter reaches "0." In this case, the time during which the transmission is delayed needs to be set to be great to the extent that the transmission on the second carrier is performed after the reception on the first carrier is ended. Such a modified example has an advantage in that transmission on the second carrier is rapidly performed because the back-off counter is relatively decreased. In this case, if such a modified example is applied, when adjacent UEs are present and several terminals receive signals on the first carrier at the same time, a problem may occur in which several UEs perform transmission on the second carrier at the same time. Time delayed to this end may be set as a random value between the terminals.

Additionally or alternatively, the example of FIG. 19 may be changed as follows. The UE may perform the example of FIG. 19 only when a specific value of the back-off counter for the second carrier (e.g., a value of the back-off counter at timing at which the reception of the first carrier is started) is a given reference value or less, and may perform a back-off operation based on only a state of the second carrier without considering a state of the first carrier when the specific value of the back-off counter exceeds the given reference value. That is, when the specific value of the back-off counter exceeds the reference value, although the reception of a signal on the first carrier is present, the UE may decrease a value of the back-off counter for the second carrier if the second carrier is determined to be idle. The reason for this is that when the specific value of the back-off counter is sufficiently greater than the reference value, transmission may be performed through the second carrier after the reception of a signal on the first carrier is ended.

In the example of FIG. 19, a reference for determining whether the state of each carrier is the busy state or the idle state may be variously determined. For example, the UE may determine whether the state of a corresponding carrier is the busy state or the idle state based on power and/or energy of a signal received on one carrier (or a signal received through a specific frequency band of one carrier). That is, the UE may determine whether the state of the carrier is busy or idle based on a conventional CCA scheme. For example, the UE may determine that a carrier is busy when power/energy of a signal exceeds a fixed reference value, and may determine that the carrier is idle if not.

Additionally or alternatively, the example of FIG. 19 may be changed as follows. For example, the UE performs a back-off operation on the second carrier based on a state of the second carrier, but may adaptively apply a busy/idle reference to the second carrier. For example, the busy/idle reference for a specific carrier (e.g., the second carrier) may be determined based on priority of data transmitted/received through the first carrier and/or the second carrier. For example, if the priority of a signal (reception data) received through the first carrier is high, the UE may set a CCA critical value applied to the second carrier (i.e., critical value of received power/energy) as a sufficiently low value (e.g., value lower than a minus infinity value or the existing value). If the CCA critical value is lowered, the UE may delay transmission through the second carrier because the state of the second carrier may be determined to be the busy state. An interval in which the CCA critical value is lowered may be adaptively set by the UE. Additionally or alternatively, the busy/idle reference for a specific carrier (e.g., the second carrier) may be determined based on latency of data transmitted/received through the first carrier and/or the second carrier. For example, if the transmission of data for the second carrier cannot be delayed, the UE may rapidly decrease a value of the back-off counter for the second carrier by setting a CCA critical value, applied to the second carrier, as a value higher than a previous value.

The above example is related to a scheme for delaying the transmission of a signal through the second carrier in order to solve the self-interference problem. However, the scheme for solving the self-interference problem may also be solved through another method in addition to the delay of the transmission of a signal. An example in which characteristics that delay transmission on the second carrier are modified is described below.

An example of the disclosure may be modified as follows. For example, a UE may perform back-off for the second carrier and perform the transmission of a signal through the second carrier by considering only a state of the second carrier without considering signal reception on the first carrier. In this case, if an interval in which the UE transmits the signal through the second carrier and an interval in which the UE receives the signal through the first carrier overlap, the UE may decrease transmission power for the second carrier at the overlapped interval. For example, the transmission power for the second carrier may be decreased to a given value or may be determined based on received power of the first carrier. For example, the transmission power of the second carrier may be determined in proportion to reception power of the first carrier. In this case, a received SINR in the first carrier may be constantly maintained. If the transmission power of the second carrier is decreased, the UE may continue the transmission power of the second carrier without increasing the transmission power without change although reception on the first carrier is ended. Accordingly, QAM demodulation can be smoothly performed. Furthermore, if transmission power of the second carrier decreased by the UE is a critical value or less, the UE may delay transmission through the second carrier, and may start transmission through the second carrier based on power not decreased after the reception on the first carrier is ended. This is for preventing the probability that a reception UE may successfully decode the signal of the second carrier from being decreased if the transmission power of the second carrier is excessively decreased.

Furthermore, an example of the disclosure may be modified as follows. For example, a UE may perform back-off for the second carrier and perform the transmission of a signal through the second carrier by considering only a state of the second carrier without considering signal reception in the first carrier. In this case, in order to reduce interference with the first carrier, the UE may apply a guard band to the transmission of the second carrier at an interval in which the reception through the first carrier is performed. That is, an example in which the transmission of the second carrier is not delayed, but the transmission of the second carrier resource (i.e., frequency resource) is modified is possible. The guard band applied to the second carrier may be set in such a way to limit the location or bandwidth of a transmission frequency on the second carrier. For example, an edge band adjacent to the first carrier on the second carrier may be set as a guard band in which the edge band is not used for transmission. The size/location of the guard band applied to the second carrier may be fixed or may be determined by received power of the first carrier (or received resource location of the first carrier). For example, the size of the guard band for the second carrier may be set to be inverse proportion to received power of the band of the first carrier, but a received SINR in the first carrier band may be constantly maintained. Furthermore, if the UE applies the guard band to the second carrier, a reception UE may be notified of control information (e.g., information on whether to apply a guard band or the size/location of an applied guard band) related to the guard band through pre-defined signaling. Meanwhile, if a coding rate becomes a given level due to the guard band applied to the second carrier and thus the reception possibility of a surrounding terminal is very low, the UE may attempt transmission through the second carrier after the reception of the first carrier band is ended instead of applying the guard band or may perform repetition transmission (or HARQ re-transmission) by a preset number of times.

Meanwhile, the aforementioned example of FIG. 18 and/or FIG. 19 are not always applied, but may be optionally applied. That is, this is for solving a problem in that if the example of FIG. 18/19 is always applied, the transmission of the second carrier may be excessively delayed. For example, the UE may apply the example of FIG. 18/19 based on the importance/priority of data received on the first carrier and the importance/priority of data transmitted on the second carrier. That is, if the importance/priority of the first carrier is higher than that of the second carrier, the example of FIG. 18/19 may be applied. If not, the UE may perform a back-off operation (i.e., performs an operation of decreasing a back-off counter when the second carrier is idle and not decreasing the back-off counter when the second carrier is busy) based on a state of the second carrier although a signal is received through the first carrier.

The importance or priority of the first carrier/second carrier (or signal or data on a corresponding carrier) may be determined based on at least one of the following three elements.

The first element (a service type, the priority of a message, an access category or the address of a transmission or reception UE): the priority of specific data may be determined depending on the type of corresponding service. For example, data related to emergency safety service may be set to have higher priority than common data. The priority of such data may be associated with a service type field, packet priority field, or access category field in a message format or the address of a transmission terminal or reception terminal. A UE may check the priority of each data message based on such information. Furthermore, if reception in the first carrier is determined to be more important than transmission in the second carrier as a result of the check, the UE may perform the operation of FIG. 18/19.

The second element (time delay requirement in the second carrier): if the upper limit of time when transmission needs to be completed is determined for data to be transmitted in the second carrier, when relatively much time is left up to the upper limit, a UE may determine transmission in the second carrier to be less important, and may perform the operation of FIG. 18/19.

The third element (reception power in the first carrier): reception in the first carrier may be determined to be more important as reception power measured from a data signal received in the first carrier is lower, and the operation of FIG. 18/19 may be performed. In particular, this portion may have an effect of preventing interference with other terminals that similarly receive a corresponding signal with low power around en ego terminal.

Meanwhile, in the aforementioned example, the meaning that reception data (or signal/radio signal/received signal) is received through the first carrier may be materialized as follows.

For example, when energy of a given level or more is detected, it may be treated as receiving data. Although a predetermined signal, such as the preamble of IEEE802.11, is not detected, when energy is high, it is assumed to be reception, and reception data is treated as being received through the first carrier. Accordingly, a back-off operation may be performed. For example, the reference value of this energy may be set as a value higher than a CCA threshold. The existing CCA threshold was an operation of protecting the transmission of another terminal in the same carrier, whereas such a new reference value of energy may be treated as protecting the transmission of another terminal in a neighbor carrier. In another meaning, interference that will have an influence when power transmitted in the second carrier (Carrier 2) by a terminal passes over to the first carrier (Carrier 1) is considered that transmission is performed in the first carrier with the passed-over power, and this may be construed as performing carrier sensing. In general, transmission may be permitted in a situation in which a channel is busier because interference with another terminal is reduced if transmission is performed using low power.

For another example, reception data may be treated as being received through the first carrier if a predetermined sequence has only to be detected. Accordingly, a back-off operation may be performed. For example, a preamble defined based on the IEEE802.11 standard is detected. Although the address of corresponding data has not been set to be received by an ego terminal, reception data may be treated as being received through the first carrier.

For another example, reception data may be treated as being received through the first carrier only when a UE that has received a signal is an intended receiver. That is, reception data may be treated as being received through the first carrier only when address information encoded in a received signal is identical with the address of the UE. For example, although a preamble is detected through the first carrier, if corresponding data is data transmitted to another terminal and not necessary to be received by an ego terminal, the reception data may be treated as having not been received through the first carrier. In this case, back-off for the second carrier may be performed normally.

A UE based on an example of the disclosure may perform a procedure of obtaining synchronization in order to support the sidelink. Technical characteristics thereof are described below.

Figure 20:
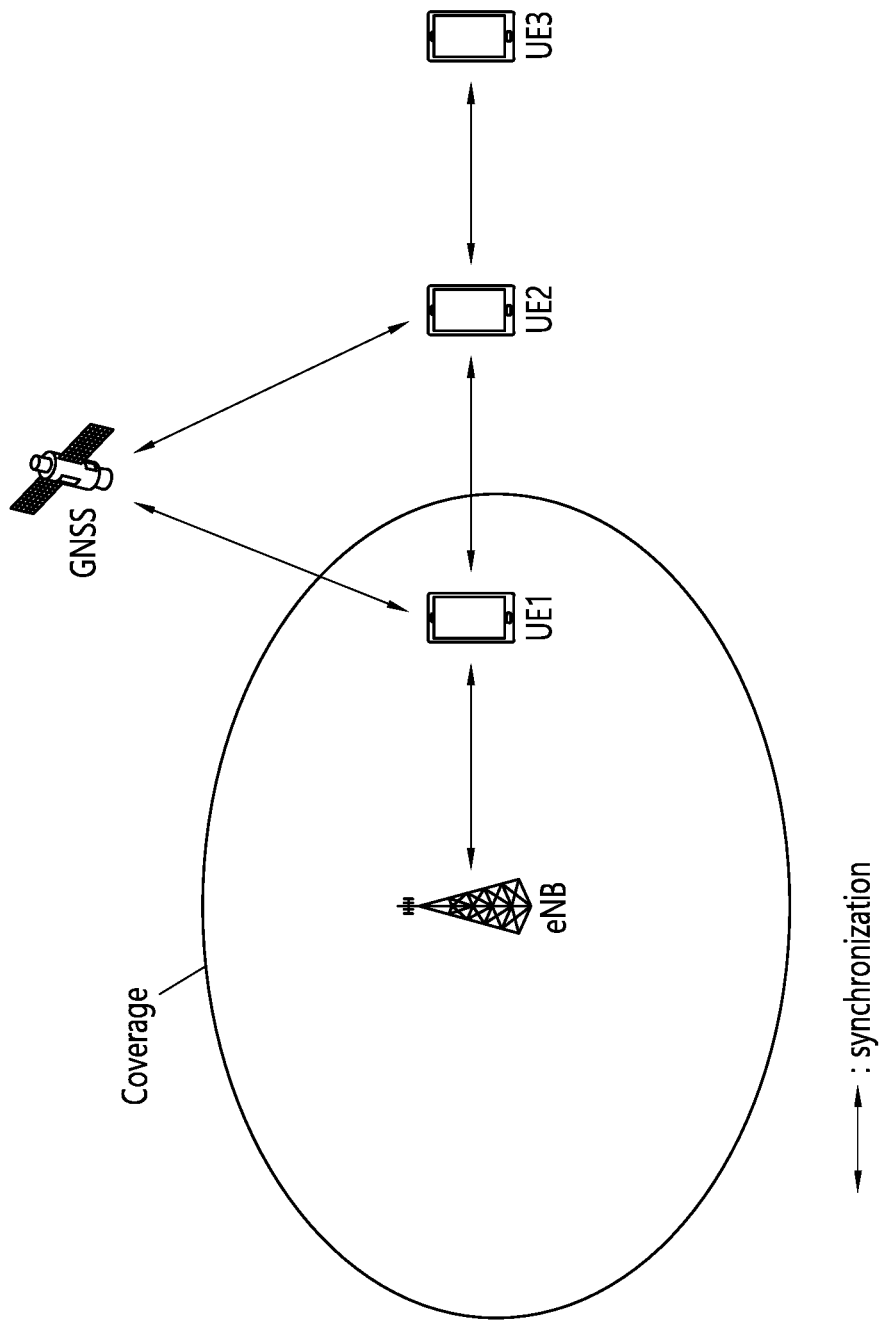
FIG. 20 is a diagram describing a procedure of performing, by a UE, synchronization.

FIG. 20 is a diagram describing a procedure of performing, by a UE, synchronization.

Referring to FIG. 20, a UE 1 is an INC UE within cell coverage of an eNB, and may perform synchronization with the eNB by directly receiving a signal necessary for the synchronization from the eNB. In this case, the eNB may be called a synchronization reference for the UE1. It may be represented that the UE1 has been directly synchronized with the eNB. Furthermore, the UE1 may perform synchronization with a global navigation satellite system (GNSS) by directly receiving a signal necessary for the synchronization from the GNSS. In this case, the GNSS may be called a synchronization reference for the UE1. It may be represented that the UE1 has been directly synchronized with the GNSS. After being synchronized with the eNB or the GNSS, the UE1 may transmit an SLSS and/or a PSBCH for another terminal.

A UE 2 is an OOC UE located outside the cell coverage of the eNB, and may perform synchronization with the GNSS by directly receiving a signal necessary for the synchronization from the GNSS. In this case, the GNSS may be called a synchronization reference for the UE2. Furthermore, the UE2 may perform synchronization by receiving a signal necessary for the synchronization from the UE1. After being synchronized with the GNSS or the UE1, the UE2 may transmit an SLSS and/or a PSBCH for another terminal.

A UE 3 is an OOC UE located outside the cell coverage of the eNB, and may perform synchronization by receiving a signal necessary for the synchronization from the UE2. The UEs 1, 2 and 3 may be sidelink terminals/V2X terminals supporting the sidelink.

An OOC UE, such as the UE2, may perform an SLSS (/PSBCH) transmission operation. To this end, an SLSS (PSBCH) resource may be configured in the OCC UE. In this case, in the case of an OOC UE having a synchronization channel reference resource using the GNSS as a reference, i) an SLSS (/PSBCH) resource in which a PSBCH (/SLSS) is received from another UE (e.g., INC UE) and relayed and ii) an SLSS (/PSBCH) resource in which a PSBCH (/SLSS) is transmitted after a GNSS synchronization reference is directly selected by the OOC UE may be configured (/signaled) differently (or independently) in a time region. That is, in FIG. 20, an SLSS/PSBCH resource used when the UE 2 receives an SLSS/PSBCH from the UE 1 and transmits/relays the SLSS/PSBCH, and an SLSS/PSBCH resource used when the UE 2 transmits an SLSS/PSBCH after performing synchronization with the GNSS may be differently or independently configured/signaled.

Figure 21:
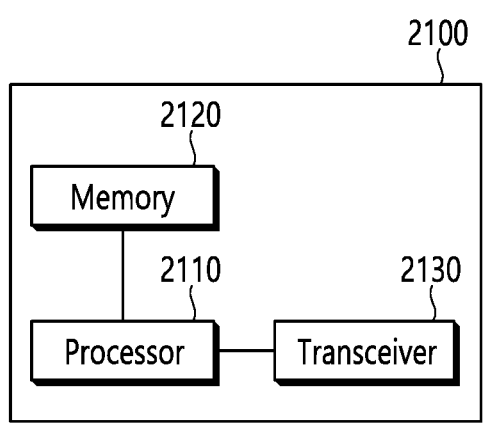
FIG. 21 illustrates an example of a UE/terminal to which an example of the disclosure is applied.

FIG. 21 illustrates an example of a UE/terminal to which an example of the disclosure is applied.

Referring to FIG. 21, the terminal 2100 includes a processor 2110, a memory 2120 and a transceiver 2130. The illustrated processor, memory and transceiver may be implemented as separated chips or at least two blocks/functions may be implemented through one chip.

The illustrated transceiver 2130 performs an operation of transmitting/receiving a signal. Specifically, the transceiver 2130 may transmit and receive signals for obtaining synchronization. Furthermore, the transceiver 2130 may receive a radio signal based on the IEEE 802.11 standard or a 3GPP standard (e.g., LTE/LTE-A/NR standard), and may decode the radio signal. Furthermore, the transceiver 2130 may obtain information for checking whether a state of the first carrier and/or the second carrier is the idle state or the busy state. That is, the transceiver 2130 may obtain power or an energy value for the radio signal. Furthermore, the transceiver 2130 may control power or a bandwidth of a transmission signal in response to an instruction from the processor 2110.

The processor 2110 may implement the functions, processes and/or methods proposed in the disclosure. Specifically, the processor 2110 may determine transmission timing or transmission power/transmission band for the second carrier based on information on a state of the first carrier and information on a state of the second carrier, which are obtained through the transceiver 2130. That is, the processor 2110 may check whether a signal is received through the first carrier and whether the state of the second carrier is the idle/busy state based on the information obtained through the transceiver 2130. Furthermore, the processor 2110 may set at least one back-off counter and determine a value of the back-off counter.

The processor 2110 may include an application-specific integrated circuit (ASIC), other chipsets, logic circuits, and data processors. The memory 2120 may include a read-only memory (ROM), a random access memory (RAM), a flash memory, a memory card, a storage medium and/or other storage devices.

Figure 22:
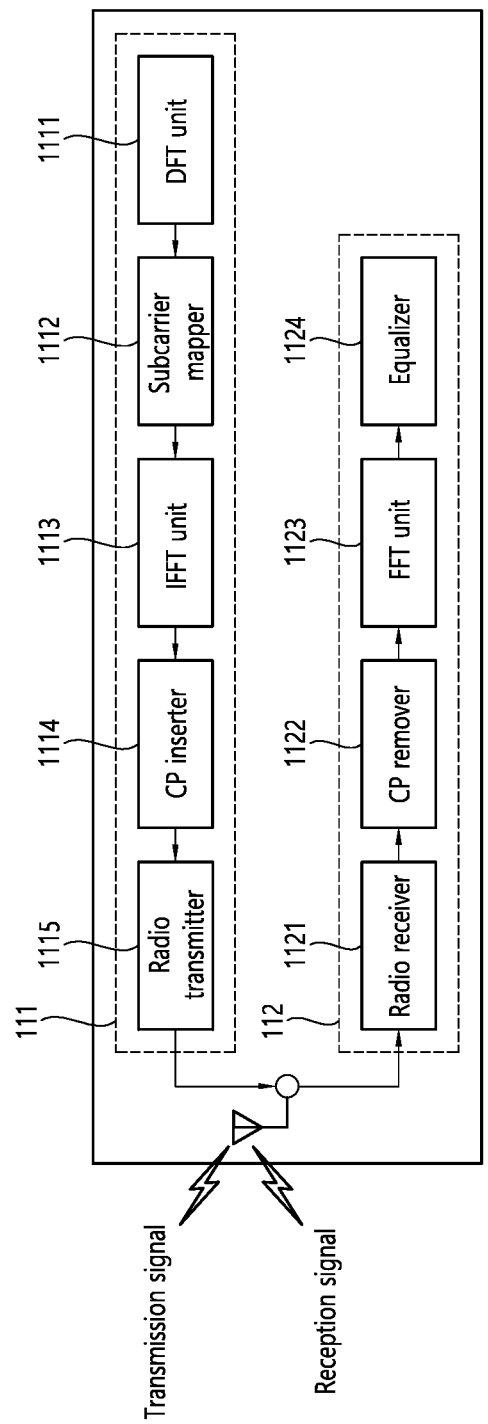
FIG. 22 illustrates another example of a detailed block diagram of a transceiver.

FIG. 22 illustrates another example of a detailed block diagram of a transceiver. Referring to FIG. 22, the transceiver 110 includes a transmission part 111 and a reception part 112. The transmission part 111 includes a discrete Fourier transform (DFT) unit 1111, a subcarrier mapper 1112, an IFFT unit 1113 and a CP inserter 1114, and a radio transmitter 1115. The transmission part 111 may further include a modulator. Furthermore, for example, the transmission part 111 may further include a scramble unit (not illustrated), modulation mapper (not illustrated), a layer mapper (not illustrated) and a layer permutator (not illustrated), all of which may be disposed in front of the DFT unit 1111. That is, in order to prevent an increase in the peak-to-average power ratio (PAPR), in the transmission part 111, information experiences the DFT 1111 before a signal is mapped to a subcarrier. After subcarrier mapping is performed on a signal spread or precoded (having the same meaning as "spread") by the DFT unit 1111 through the subcarrier mapper 1112, the signal experiences the IFFT unit 1113 to produce a signal on a time axis.

The DFT unit 1111 outputs complex-valued symbols by performing a DFT on input symbols. For example, when Ntx symbols are input (wherein Ntx is a natural number), a DFT size is Ntx. The DFT unit 1111 is called a transform precoder. The subcarrier mapper 1112 maps the complex-valued symbols onto each subcarrier in a frequency region. The complex-valued symbols may be mapped onto resource elements corresponding to a resource block allocated for data transmission. The subcarrier mapper 1112 is called a resource element mapper. The IFFT unit 1113 outputs a baseband signal for data, that is, a time region signal, by performing an IFFT on an input symbol. The CP inserter 1114 duplicates some of the rear portion of the baseband signal for data and inserts the duplicated portion into the front portion of the baseband signal for data. Orthogonality can be maintained even in a multi-path channel because inter-symbol interference (ISI) or inter-carrier interference (ICI) is prevented through CP insertion.

Meanwhile, the reception part 112 includes a radio receiver 1121, a CP remover 1122, an FFT unit 1123, and an equalizer 1124. The radio receiver 1121, CP remover 1122, and FFT unit 1123 of the reception part 112 perform functions opposite the functions of the radio transmitter 1115, CP inserter 1114, and IFFT unit 1113 of the transmission part 111. The reception part 112 may further include a demodulator.

In FIG. 22, the transceiver may additionally include a CCA controller (not illustrated) for measuring power/energy of at least one carrier based on a CCA scheme in addition to the illustrated block, and may additionally include a transmission controller (not illustrated) for controlling a transmission power/transmission band of at least one carrier.

What is claimed is:

1. A method for a user equipment (UE) supporting a sidelink, the method comprising:
   configuring, by the UE, a first carrier and a second carrier, wherein the second carrier is used for the sidelink;
   performing, by the UE, a back-off operation based on a back-off counter for the second carrier, wherein the back-off operation is performed based on whether the UE receives reception data through the first carrier; and
   determining, by the UE, whether to transmit transmission data through the second carrier based on the back-off counter.

2. The method of claim 1, wherein the back-off operation is performed based on whether the second carrier is idle.

3. The method of claim 2, wherein the UE decreases a value of the back-off counter when the second carrier is determined to be idle and the UE does not receive the reception data through the first carrier.

4. The method of claim 2, wherein the UE maintains a value of the back-off counter when the second carrier is determined to be idle and the UE receives the reception data through the first carrier.

5. The method of claim 2, wherein the UE determines whether the second carrier is idle based on received power of a received signal received through the second carrier.

6. The method of claim 1, wherein the back-off operation is performed based on priority of the reception data and/or latency of the transmission data.

7. The method of claim 1, wherein the back-off operation is performed based on a preset time unit.

8. The method of claim 1, wherein the UE is configured to communicate with at least one of another UE, a wireless communication server, and/or an autonomous vehicle.

9. A user equipment (UE) supporting a sidelink, comprising:
   a transceiver supporting a first carrier and a second carrier; and
   a processor controlling the transceiver,
   wherein the processor is configured to configure the first and second carriers based on the transceiver, wherein the second carrier is used for the sidelink,
   the processor is configured to perform a back-off operation based on a back-off counter for the second carrier, wherein the back-off operation is performed based on whether the UE receives reception data through the first carrier, and
   the processor determines whether to transmit transmission data through the second carrier based on the back-off counter.

10. The UE of claim 9, wherein the back-off operation is performed based on whether the second carrier is idle.

11. The UE of claim 10, wherein the processor is configured to decrease a value of the back-off counter when the second carrier is determined to be idle and the UE does not receive the reception data through the first carrier.

12. The UE of claim 10, wherein the processor is configured to maintain a value of the back-off counter when the second carrier is determined to be idle and the UE receives the reception data through the first carrier.

13. The UE of claim 10, wherein the processor is configured to determine whether the second carrier is idle based on received power of a received signal received through the second carrier.

14. The UE of claim 9, wherein the back-off operation is performed based on priority of the reception data and/or latency of the transmission data.

15. The UE of claim 9, wherein the back-off operation is performed based on a preset time unit.

16. The UE of claim 9, wherein the transceiver is further configured to communicate with at least one of another UE, a wireless communication server, and/or an autonomous vehicle.

* * * * *